US006886744B2

(12) United States Patent
Ichihara et al.

(10) Patent No.: US 6,886,744 B2
(45) Date of Patent: May 3, 2005

(54) AUTOMATIC VENDING APPARATUS INVOLVING CONTRACT AND VENDING SYSTEM

(75) Inventors: Seiji Ichihara, Tokyo (JP); Kunihiro Nomura, Tokyo (JP); Jirou Kino, Tokyo (JP); Kazuya Seo, Tokyo (JP)

(73) Assignees: Hitachi, Ltd., Tokyo (JP); Hitachi Asahi Electronics Co., Ltd., Owaraiasahi (JP)

( * ) Notice: Subject to any disclaimer, the term of this patent is extended or adjusted under 35 U.S.C. 154(b) by 56 days.

(21) Appl. No.: 09/796,874

(22) Filed: Feb. 28, 2001

(65) Prior Publication Data

US 2001/0025883 A1 Oct. 4, 2001

(30) Foreign Application Priority Data

Feb. 24, 2000 (JP) ....................................... 2000-052221
Jan. 16, 2001 (JP) ....................................... 2001-007154

(51) Int. Cl.[7] .................................................. G06F 7/08
(52) U.S. Cl. ........................ 235/381; 235/378; 235/383
(58) Field of Search ................................ 235/381, 379, 235/380, 378, 382, 383; 902/1, 15, 30, 5, 18; 705/1, 35, 39, 44

(56) References Cited

U.S. PATENT DOCUMENTS 4,847,900 A * 7/1989 Wakim ........................ 379/424
5,465,288 A * 11/1995 Falvey et al. ............... 455/418
5,845,262 A * 12/1998 Nozue et al. ................. 705/26
5,887,253 A * 3/1999 O'Neil et al. ............... 455/418
5,946,660 A * 8/1999 McCarty et al. ............... 705/5
5,971,273 A * 10/1999 Vallaire ...................... 235/381
5,974,311 A * 10/1999 Lipsit ......................... 455/418
6,148,293 A * 11/2000 King ........................... 705/35
6,167,251 A * 12/2000 Segal et al. ................. 455/406
6,396,919 B1 * 5/2002 Shimada et al. ....... 379/265.12

FOREIGN PATENT DOCUMENTS

DE 29908944 * 12/1999 ........... G07F/17/40
DE 19923365 * 11/2000 ........... G07F/17/40
WO 01/15096 * 3/2001 ............. G07F/7/02

* cited by examiner

*Primary Examiner*—Daniel Stcyr
(74) *Attorney, Agent, or Firm*—Townsend and Townsend and Crew LLP

(57) ABSTRACT

After a contract terminates in a contract part with personal identification and the input of contract contents, a control part controls the door of a sales storing box in which a product to be purchased is stored, and vends the product by opening the door.

8 Claims, 37 Drawing Sheets

FIG.7

50 52 51

| | | |
|---|---|---|
| B1 | H01 | 2 |
| B2 | T01 | 1 |
| B3 | K02 | 0 |
| B4 | D01 | 1 |
| B5 | P01 | 2 |
| E | E | E |
| | | |

53

FIG.22
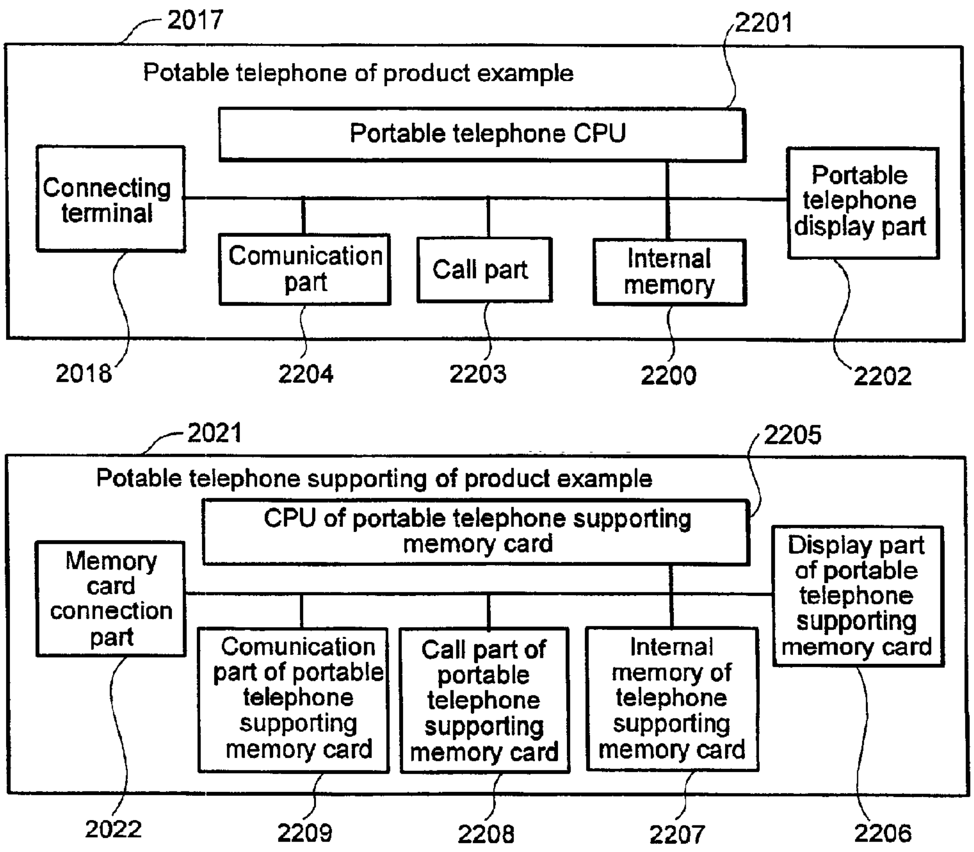
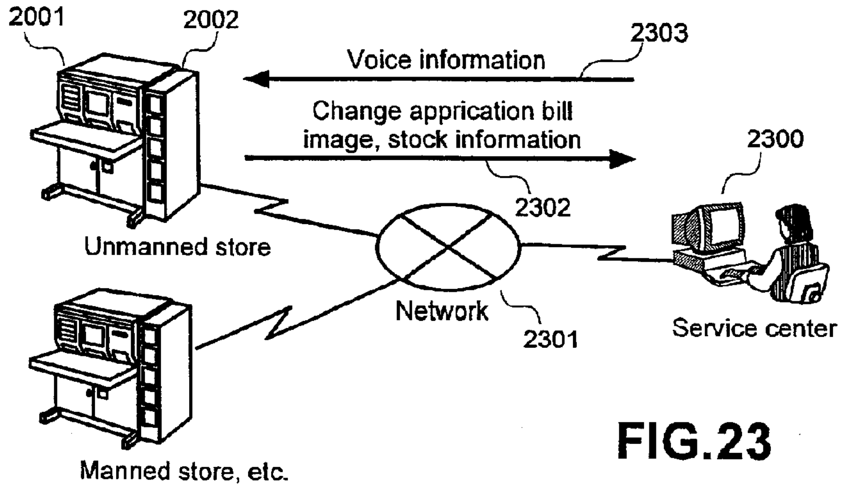
FIG.23

FIG.24

2400 2402 2401

| | | |
|---|---|---|
| B1 | T01 | Not present |
| B2 | H01 | Present |
| B3 | K02 | Not present |
| B4 | D01 | Present |
| B5 | P01 | Present |
| E | E | E |
| | | |

2403

FIG.38

2400 2402 1900 2401

| | | | |
|---|---|---|---|
| B1 | T01 | Cable B | No present |
| B2 | H01 | Cable D | Present |
| B3 | K02 | Cable B | No present |
| B4 | D01 | Cable B | Present |
| B5 | P01 | Cable F | Present |
| E | E | E | E |
| | | | |

2403

AUTOMATIC VENDING APPARATUS INVOLVING CONTRACT AND VENDING SYSTEM

BACKGROUND OF THE INVENTION

1. Field of the Invention

The present invention relates to an apparatus and a method for vending and contract-changing products involving contract.

2. Description of Related Arts

An automatic contract apparatus, as a means for making contracts for financial products and the like, performs personal identification and a credit check following it according to guidance screens. Further, an automatic vending apparatus is a terminal that enables drinking water and the like to be purchased from a machine when cash is entered to the machine. Presently, there are neither automatic contract apparatuses for vending products nor automatic vending apparatuses involving contract. For example, in the case of an automatic contract apparatus, a card capable of financing is only issued after a contract is concluded through communication with a remote operator by the unmanned automatic contract apparatus. Cash can be received by using an ATM with the card.

SUMMARY OF THE INVENTION

Generally, a contract for a product is made in such a way that a user goes to a product vending store, has a driver's license and a credit card on hand, and makes communication with a salesclerk. The applicant fills out a given form according to clerk's directions, and selects a contract plan and the like. At the same time, the user is authenticated by the driver's license and the like, a copy of the driver's license and the like are sent to a credit check center or the like, and the center checks the contract.

In making the contract for the product, if the store is out of business hours, the user must go to the store again at a different time. Further, the number of clerks to process contracts is limited, so that a large number of applicants cannot be treated at a time.

The present invention has been made in view of the above described problems, and an object of it is to provide an automatic vending apparatus with an automatic contract function used for contracts for products even when clerks are absent, and a method of vending by such an apparatus.

To achieve the above described object, the present invention comprises a contract part that authenticates a principal by a driver's license and an image to process a contract, sales storing boxes that store products received by users when contracts are normally concluded, and a control apparatus that controls the opening and closing of the sales storing boxes, wherein the control apparatus controls a specified box door of the sales storing boxes when the contract part concludes a contract and a product is specified.

BRIEF DESCRIPTION OF THE DRAWINGS

Preferred embodiments of the present invention will be described in detail based on the followings, wherein:

FIG. 7 is a diagram showing the structure of file data;

FIG. 22 is a drawing showing the internal structure of a portable telephone of a product example;

FIG. 23 is a drawing showing system configuration;

FIG. 24 is a drawing showing the structure of file data;

FIG. 38 is a drawing the structure of file data in a fifth embodiment example.

DESCRIPTION OF THE PREFERRED EMBODIMENTS

Hereinafter, preferred embodiments of the present invention will be described in detail with reference to the accompanying drawings. The present invention is not limited to these embodiments.

Figure 1:
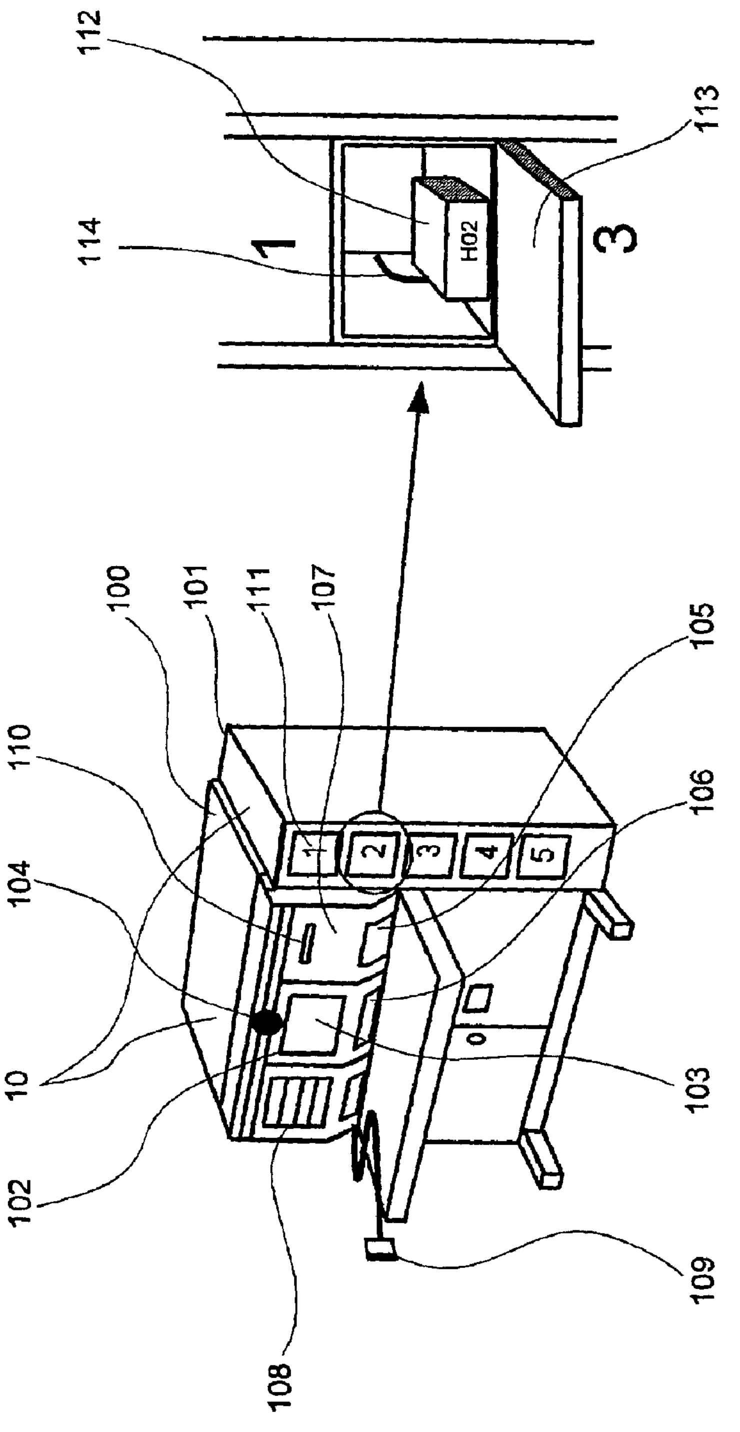
FIG. 1 is a drawing showing an automatic vending apparatus with automatic contract function according to an embodiment of the present invention.

The present embodiment describes an example of vending a portable telephone, exemplified as a product involving contract, after making a contract. FIG. 1 is a drawing showing an automatic vending apparatus 10 with an automatic contract function according to an embodiment of the present invention. In the drawing, a reference numeral 100 designates a contract part comprising an automatic contract apparatus based on remote dialog; 101, a sales part automatically vending a product upon order; 102, a display part of the contract part 100; 103, an input part such as a touch panel formed on the display part 102; 104, a personal identification camera for personal identification; 105, an identification card read part for personal certification; 106, a certificate issuance part for ejecting, after contract, a certificate on which contract contents are printed; 107, a magnetic card part for issuing magnetic card; 108, a contract papers storing box in which papers necessary for contract, written at the time of contract, are stored; 109, a portable telephone connecting cable, connected with a portable telephone, for exchanging information; 110, an IC card part for issuing an IC card 703 inserted into a portable telephone to provide services, and reading and writing the IC card; 111, sales storing boxes for storing products such as portable telephone; 112, a sales product; 113, the lids of the sales storing boxes controlled in opening and closing by an electronic lock; and 114, a product connecting cable for keeping track of product stock.

Figure 2:
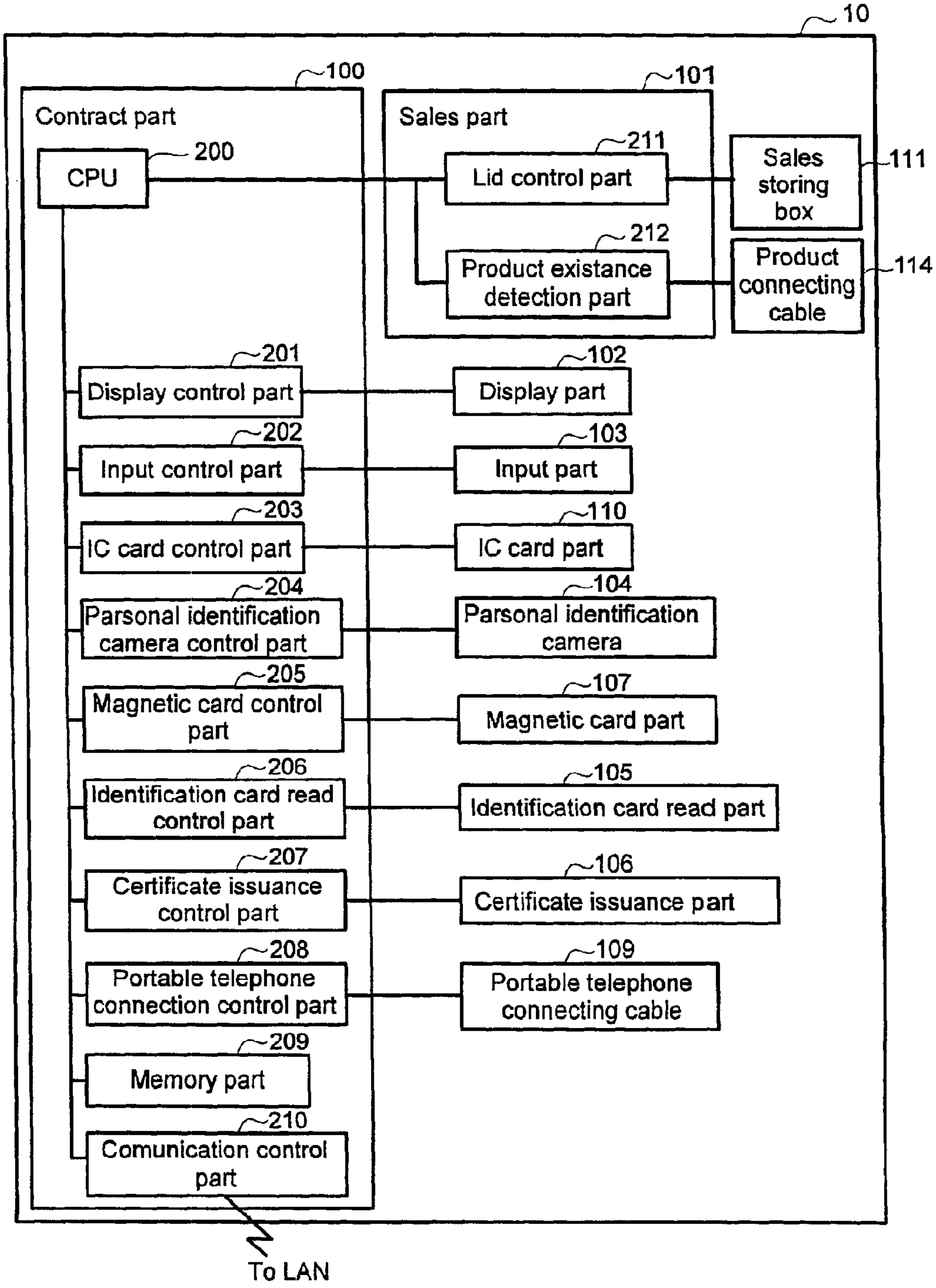
FIG. 2 is a drawing showing the internal structure of an automatic vending apparatus with automatic contract function according to an embodiment of the present invention.

FIG. 2 is a drawing showing the internal structure of the automatic vending apparatus 10 with automatic contract function shown in FIG. 1. In the drawing, the CPU 200 is a control means that controls the whole of the automatic vending apparatus 10 with automatic contract function. A reference numeral 201 designates a display control part for controlling the display of the display part 102; 202, an input control part for controlling information from the input part 103 such as a touch panel; 203, an IC card control part for controlling the issuance of an IC card issued from the IC card part 110 and controlling the reading and writing of an inserted IC card; 204, a personal identification camera control part for controlling a personal identification camera 104; 205, a magnetic card control part for controlling the magnetic card part 107; 206, an identification card read control part for controlling the identification card read part 105; 207, a certificate issuance control part for controlling the certificate issuance part 106; 208, a portable telephone connection control part for providing various services in conjunction with a portable telephone connected through the portable telephone connecting cable 109; 209, a memory part for storing product stock information and the like; 210, a communication control part for controlling connection with LAN during communications with the outside; 211, a lid control part for controlling the locking and unlocking of the lid of the sales storing box 111; and 212, a product existence detection part for detecting the contents of the sales storing box 111 through the product connecting cable 114.

Figure 3:
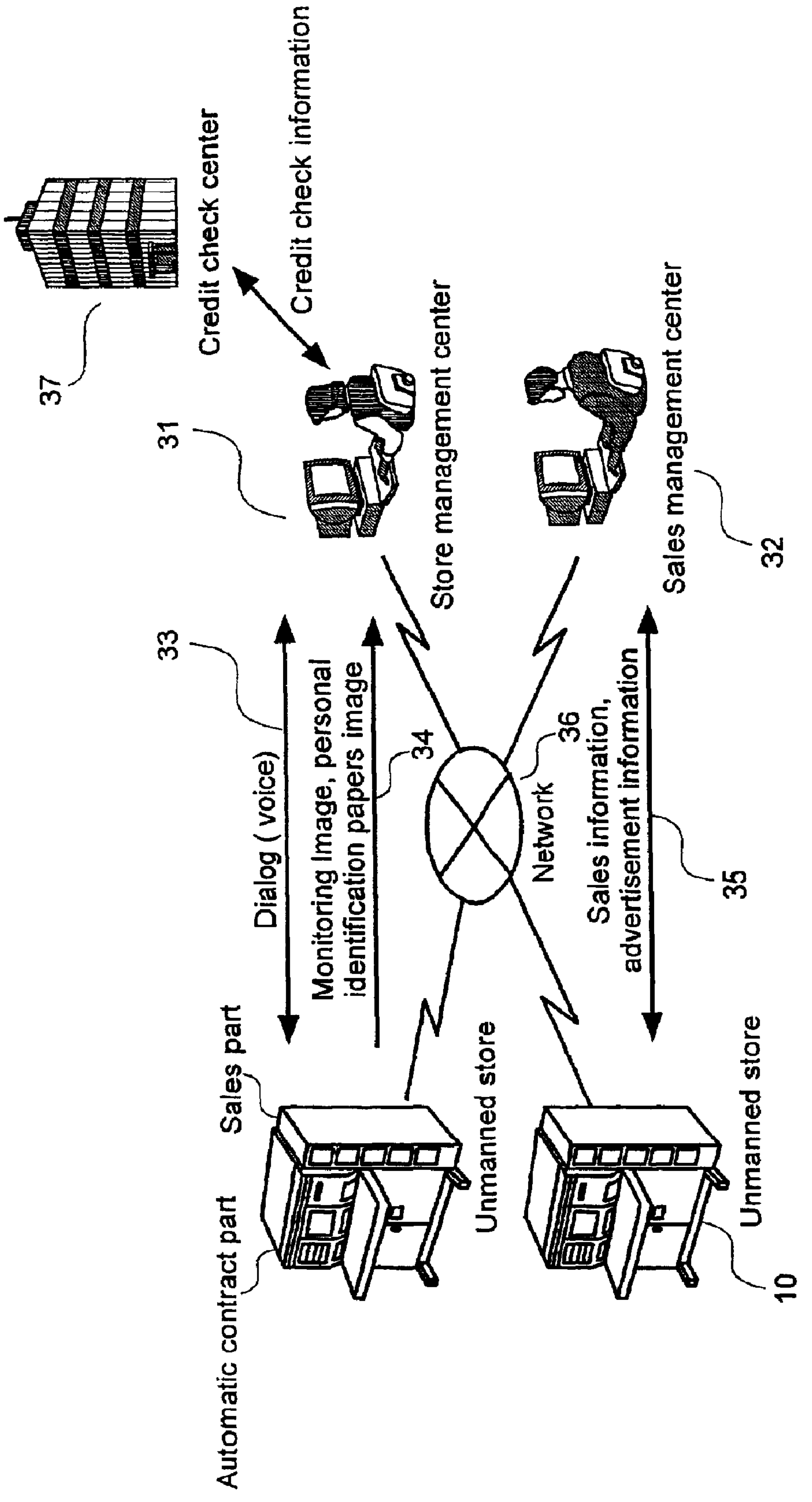
FIG. 3 is a drawing showing a system configuration according to an embodiment of the present invention.

FIG. 3 is a drawing showing a system configuration the automatic vending apparatus 10 with automatic contract function. The automatic vending apparatus 10 with automatic contract function is connected to a store management center 31 and a sales management center 32 over a network 36 such as ISDN. The store management center 31 keeps track of the status of consumables, such as out of paper, and illegal acts. Furthermore, the store management center 31 receives dialog (voice) 33 with a user, personal identification papers image 34 such as driver's license, and personal face image over the network 36 from the automatic vending apparatus 10 with automatic contract function, and makes a contract for a portable telephone while making dialog with an operator. The sales management center 32, based on sales information 35 from automatic vending apparatuses 10 with automatic contract function at stores, keeps track of stock information of portable telephones at individual stores, and issues a replenishment request. New services and update information on product sale are also provided via the sales management center 32.

Figure 4:
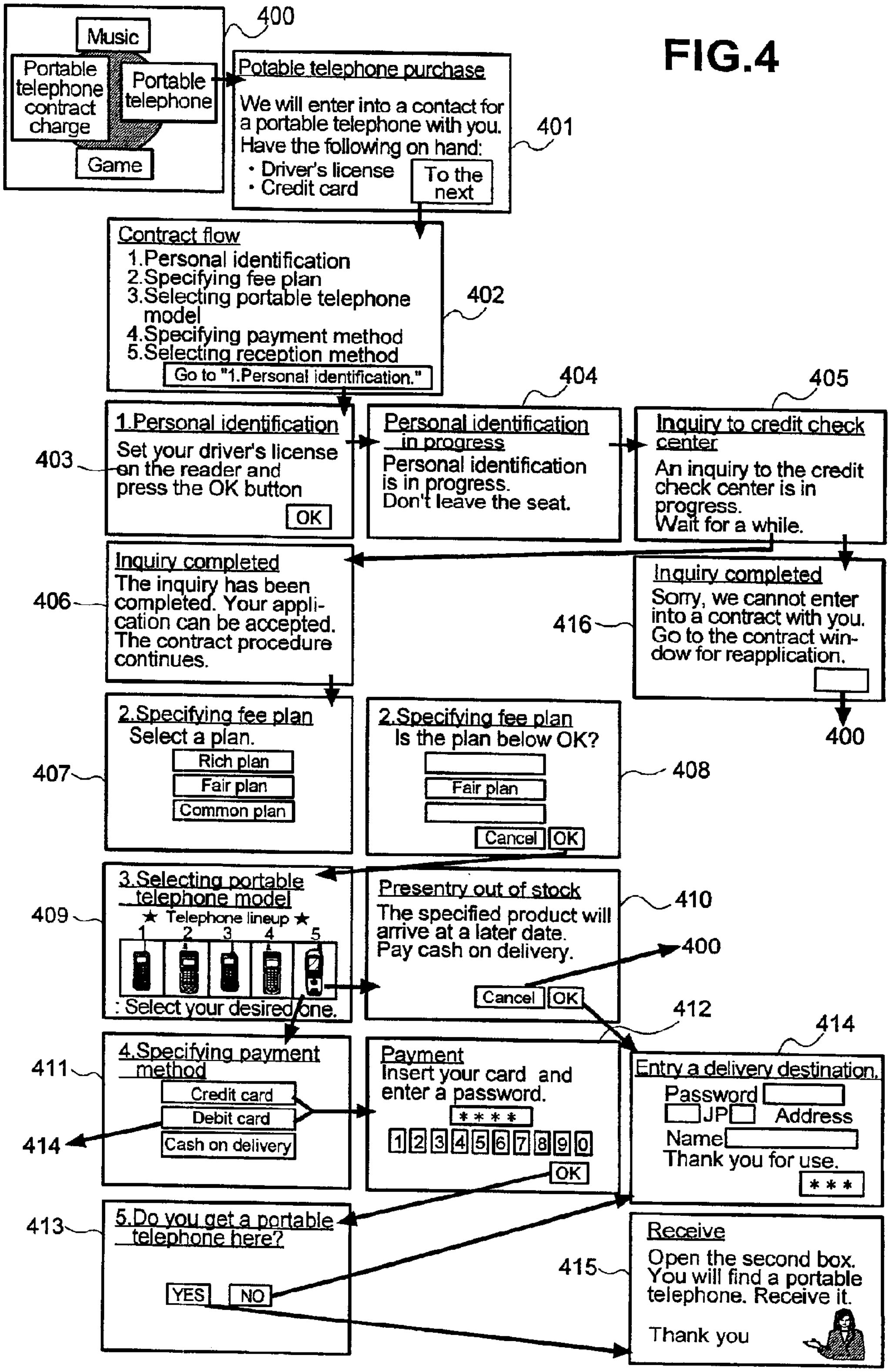
FIG. 4 is a drawing showing the transition of display screens when a new contract is selected.
Figure 6:
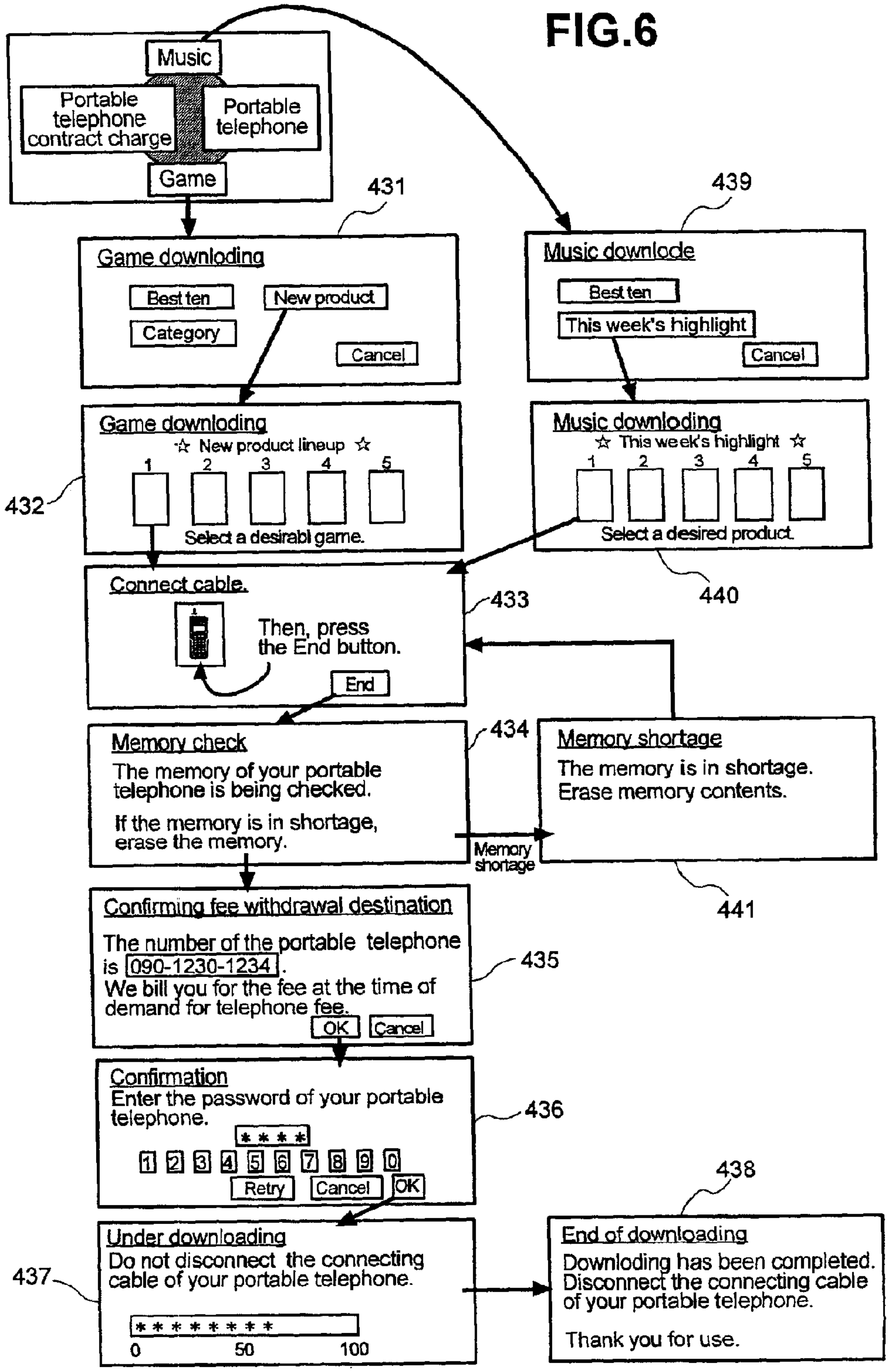
FIG. 6 is a drawing showing the transition of display screens when game or music downloading is selected.

FIG. 4 or FIG. 6 are drawings for explaining the process of portable telephone contract sale by use of the automatic vending apparatus 10 with automatic contract function according to an embodiment of the present invention.

FIG. 4 is a drawing showing the transition of display screens displayed in the display part 102 of the automatic vending apparatus 10 with automatic contract function under control of the display control part 201. Input is made through the input part 103 controlled by the input control part 202. In the drawing, a reference numeral 400 designates an initial screen, which displays a "Portable telephone" button pressed when a user makes a contract for portable telephone and purchases the body of a portable telephone; a "Portable telephone contract change" button pressed to change the contract contents of a portable telephone; a "Music" button pressed to download music to the internal memory of a portable telephone 700 carried with the user or IC card 703; and a "Game" button pressed to download game to the internal memory or IC card 703 of a user's portable telephone 700. 401 designates an advance confirmation screen, displayed when a user presses the "Portable telephone" button, for confirming things necessary for contract, used to inquire of the user the possession of a driver's license and the like necessary for contract. A screen 402 displays a procedure for contract sale of a portable telephone to indicate the overall contract to the user. A screen 403, which is used to confirm the principal by a driver's license, prompts the user to set the driver's license on the identification card read part 105. A screen 404 is displayed to confirm the principal by comparing the face image of the driver's license and the principal's image obtained by the personal confirmation camera 104. A screen 405 is displayed to inquire of a credit check center whether there were illegal acts such as fee delinquency in a past portable telephone contract. A screen 406 tells the end of credit check and indicates that the portable telephone application work can continue. A screen 416 is displayed when it is judged that the contract is improper as a result of the inquiry to the credit check center in the screen 405. A screen 407 is a selection screen for having the user select a fee plan for portable telephone. A screen 408 is a screen for confirming a call fee plan selected by the user. A screen 409 is a screen for having the user select the model of the portable telephone body. A screen 410 is a confirmation screen displayed when the portable telephone body selected in the screen 409 by the user is out of stock and is ordered. A screen 411 is a screen for selecting a payment method at the time of contract sale of portable telephone by the user pressing one of credit card, debit card, and cash on delivery buttons. A screen 412, which is displayed when the user selects credit card as a purchase method, prompts the user to insert a credit card into the magnetic card part 107 and enter a password. A screen 413 is displayed, after the contract and a payment method have been decided, to have the user select whether to receive the portable telephone in the place or sent it by mail to a specified destination. A screen 414 is a screen for selecting a deliver destination when delivery to a specified destination is selected, and prompts the user to enter a delivery destination. The application terminates when a delivery destination is inputted. A screen 415 is displayed when the receipt of portable telephone in the place is specified in the screen 413, and prompts the user to take out the portable telephone body from the sales storing box 111 of the sales part 101. Furthermore, it prompts the user to receive a contract content bill (copy for the user) on which the contract contents are printed.

Figure 5:
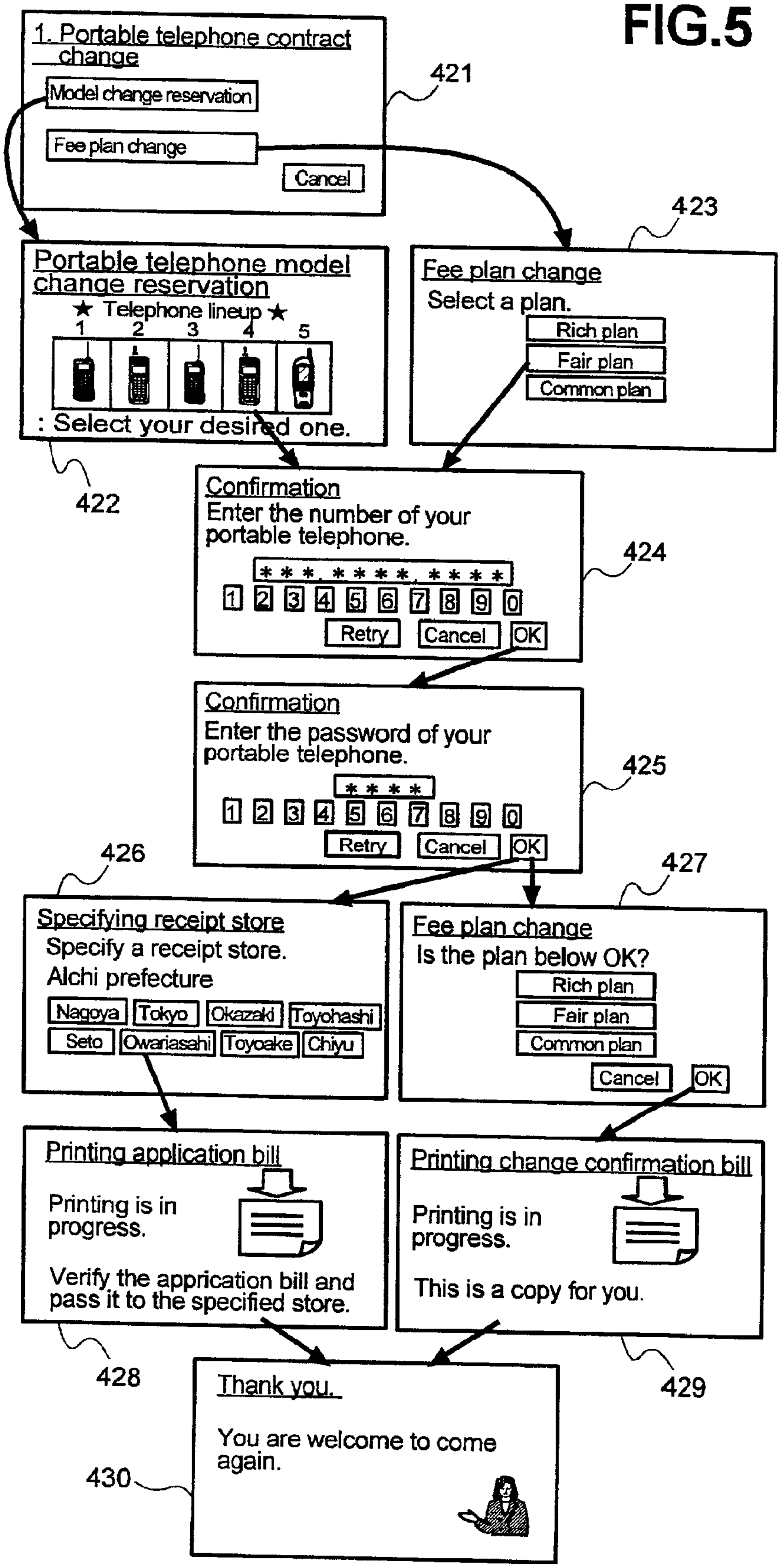
FIG. 5 is a drawing showing the transition of display screens when model change or fee plan change is selected.

When the "Portable telephone contract change" button is pressed in the screen 400 of FIG. 4, a screen 421 shown in FIG. 5 is displayed to have the user select model change reservation or fee plan change. A screen 422 is displayed when a "Model change reservation" button is pressed in the screen 421; the user specifies a portable telephone model to change to. A screen 423 is displayed when a "Fee plan change" button is pressed in the screen 421; the user specifies a fee plan to change to. A screen 424 is a screen for entering a portable telephone number for personal identification to make portable telephone contract change. A screen 425 is a screen for entering the password of portable telephone. A screen 426 is a screen for specifying a store that makes model change; actual model change is made in a manned stored. A screen 427 is a screen for having the user confirm the fee plan specified in the screen 423. A screen 428 is displayed when an application containing a model name, a receipt store, and other information is being printed. A screen 429 is displayed when a change confirmation bill containing the contents of a changed fee plan is being printed. A screen 430 is displayed after the application bill and the change confirmation bill have been printed.

When the Game button is pressed in the screen 400, a screen 431 shown in FIG. 6 is displayed. The screen 431 displays categories for selecting a game. A screen 432, which is displayed when a "New product" button is pressed on the screen 431, displays game titles and advertisement images. A screen 433, which is displayed when contents to be downloaded are decided, prompts the user to connect a portable telephone connecting cable to the portable telephone to download the contents to the internal memory of the portable telephone. Although game and music may be downloaded to the internal memory of portable telephone and the IC card 703, subsequent descriptions assume that they are downloaded to the internal memory. It goes without saying that they can be downloaded to the IC card 703 by using the IC card part 110. By pressing an End button upon completion of connection, a screen 434 is displayed. The screen 434 is displayed when the capacity of memory within portable telephone is being checked. If the memory is in shortage, a screen 441 is displayed, and then the screen 433 is displayed again. Although downloading is made to the internal memory of portable telephone herein, downloading can also be made to a recording medium such as the IC card 703 that can be inserted into the portable telephone 700, through the IC card part 110. A screen 435 displays a portable telephone number obtained at the time of memory check and inquires of the user whether the number may be used to withdraw contents fee from a usual call fee withdrawal destination. A screen 436 is a screen for entering a password to prevent illegal use of portable telephone. A password is entered, and when it is judged by the store management center 31 that it is a correct password, downloading is started, and a screen 437 is displayed to indicate that downloading is in progress. At normal completion of downloading, a screen 438 is displayed to indicate the end of downloading.

FIG. 7 is a drawing showing the data structure of stock information stored in the memory part 209 of the automatic vending apparatus 10 with automatic contract function. In FIG. 7, a reference numeral 50 designates the names of the sales storing boxes 111; 51, stock information (unit count data) corresponding to the box names 50; 52, the model names of portable telephone bodies; and 53, a symbol indicating the end of data.

Figure 8:
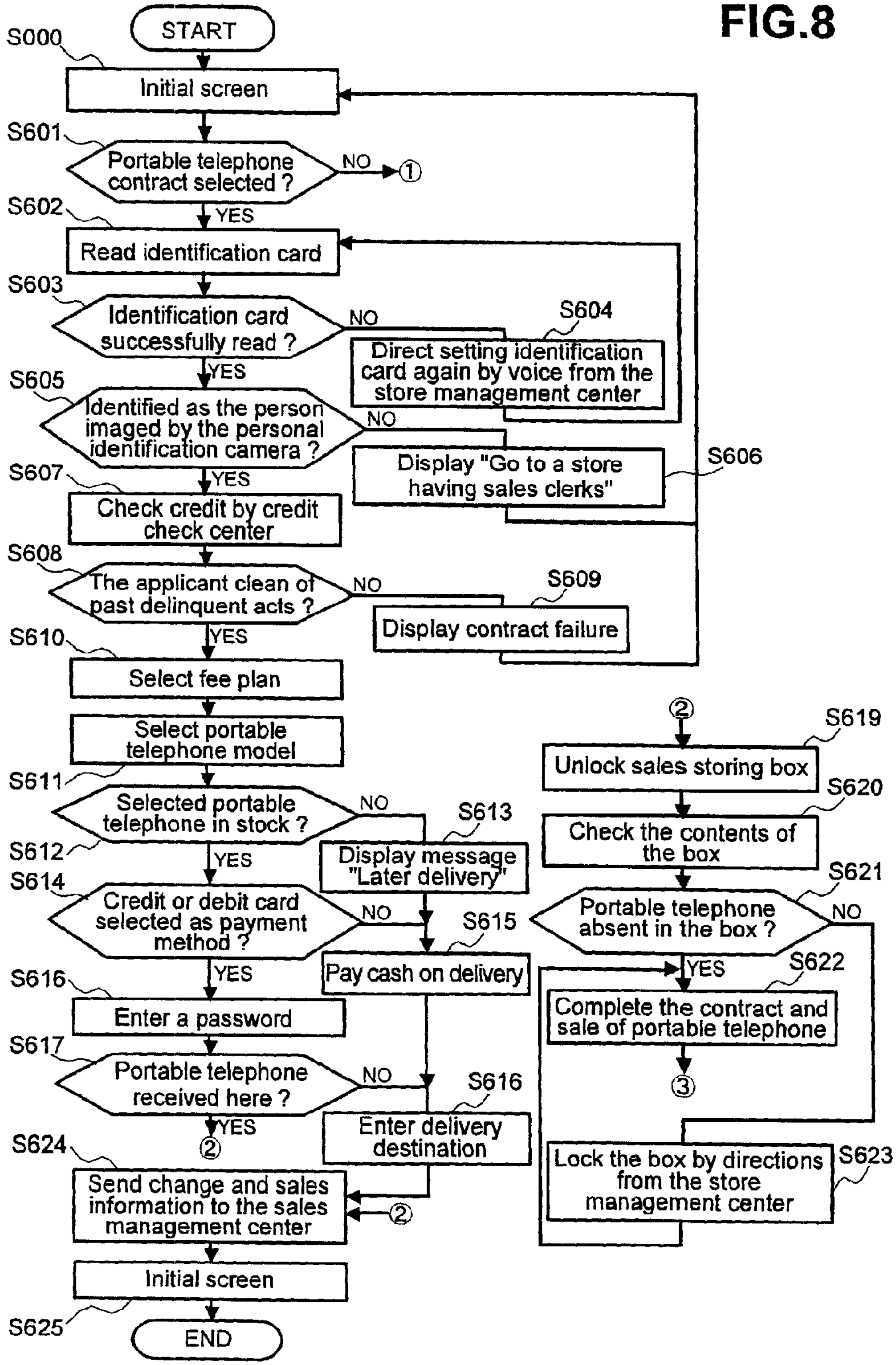
FIG. 8 is a flowchart of new contract processing performed by an automatic vending apparatus with automatic contract function.
Figure 9:
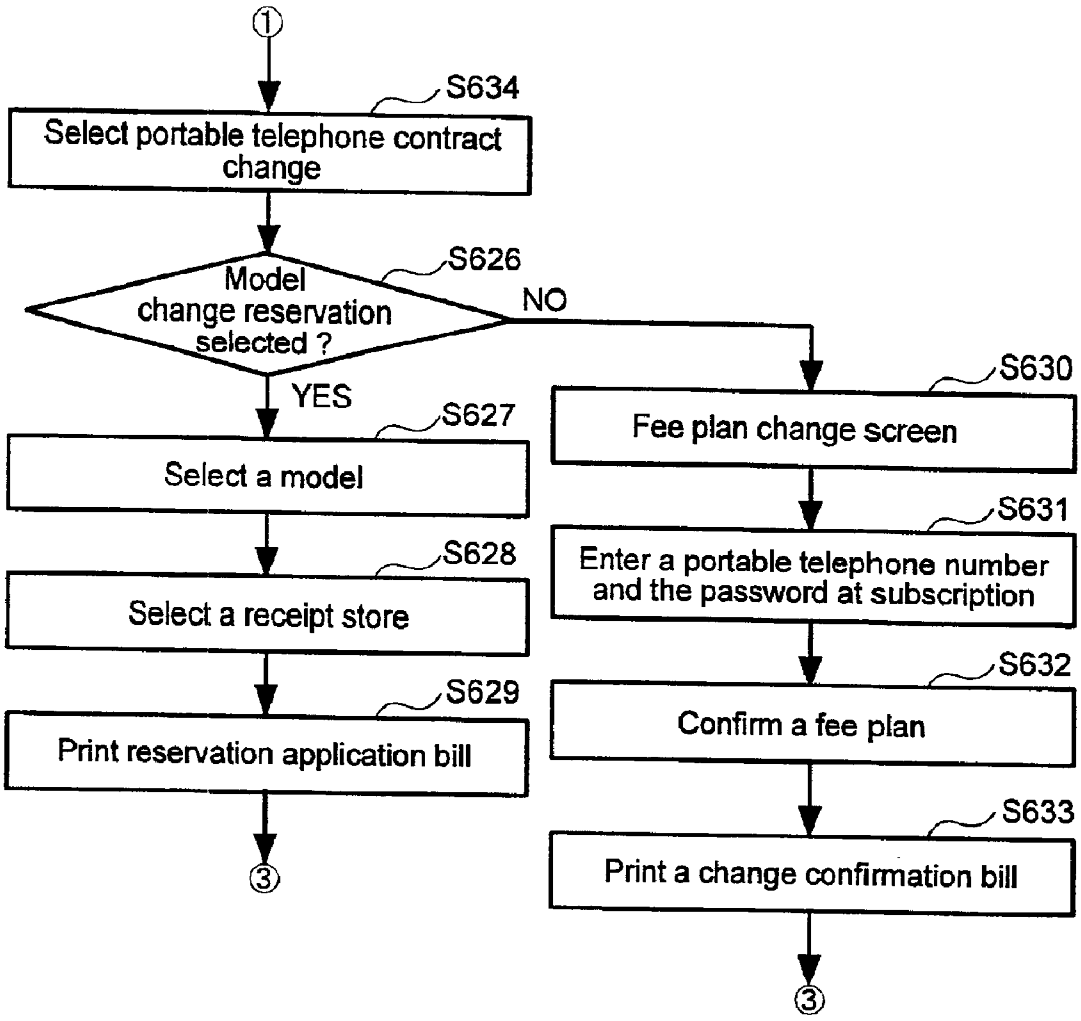
FIG. 9 is a flowchart of model change processing or fee plan change processing performed by an automatic vending apparatus with automatic contract function.

FIGS. 8 and 9 are flowcharts showing processing performed by the automatic vending apparatus 10 with automatic contract function. The initial screen 400 shown in FIG. 4 is displayed in the display part 102 of the automatic vending apparatus 10 with automatic contract function (S600). To purchase a product involving contract, that is, to newly subscribe to portable telephone, a user presses the "Portable telephone" button. It is judged whether a new contract for portable telephone is selected (S601). In the screen 403, an identification card is read in the identification card read part 105 and the identification card image is converted into a digital image by a digital scanner or CCD camera (S602). The image is sent to an operator of the store management center 31 over the network 36. It is determined whether the image of the identification card has been successfully read by the operator of the store management center (S603). If it cannot be read by the operator, the operator directs the image sender to correctly set the identification card by voice (S604). The operator of the store management center 31 compares the read identification card image and an applicant's face image obtained by the personal identification camera 104 controlled by the personal identification camera control part, and visually checks whether the applicant is the principal of the identification card (S605). At this time, the screen 404 shown in FIG. 4 is displayed. If visual inspection by the image fails, the screen 416 telling the user to make a contract through a clerk at a window is displayed in the display part 102 of the automatic vending apparatus 10 with automatic contract function (S606). Information such as a name and an address obtained from information of the identification card is sent to the credit check center 37 to check applicant's credit (S607). The screen 405 shown in FIG. 4 is displayed to the user for the duration of the check. It is checked by the operator of the store management center 31 whether information indicating that the contract is OK because of no past delinquent acts is sent from the credit check center 37 (S608). If information indicating that the user is ineligible for the contract is sent as a result of the checking of the credit check center 37, to indicate rejection for the contract with the user, the screen 416 in FIG. 4F is displayed in the display part 102 of the automatic vending apparatus 10 with automatic contract function (S609). A fee plan for portable telephone is selected (S610). That is, the screens 407 and 408 in FIG. 4 are displayed in the display part 102 of the automatic vending apparatus 10 with automatic contract function, and a fee plan is selected through the input part 103. A portable telephone body is selected from the screen 409 of FIG. 4 displayed in the display part 102, through the input part 103 (S611). In S611, the stock of the selected portable telephone body is checked (S612). This is done by consulting the portable telephone body names 52 and the number of units 51 stored in the sales storing box, in the data structure shown in FIG. 7, stored in the memory part 209. If stock is 0 as a result of consulting the number of stored units, a message indicative of later delivery by mail is displayed (S613). A payment method is selected (S614). In the screen example 411 shown in FIG. 4, three methods are shown as payment methods: credit card, debit card, and cash on delivery. Herein, cash on delivery is selected as a payment method, and the user pays cash when the portable telephone body arrives at a later date. If a specified portable telephone body is out of stock (S612), similarly, the user pays cash on delivery (S615). The user is prompted to enter a password for card settlement (screen example 412 of FIG. 4). In the screen example 413 shown in FIG. 4, the user selects whether to receive the portable telephone body from the sales part 101 after the contract (S617). If the user does not wish to receive it or the specified portable telephone is out of stock (S612), the user enters a delivery destination on the screen 414 (S618). If the user receives the portable telephone body in that place, the lid 113 of a sales storing box is unlocked through the lid control part 211 according to directions from the CPU 200 (S619). The user manually opens a sales storing box of a number displayed on the screen 415 of FIG. 4, and receives a set of portable telephone body as a sales product 112. The telephone number of the set of portable telephone body is already registered in the internal memory of the portable telephone. It is detected by the product existence detection part 212 whether the user has received the set 112 of portable telephone body (S620). It is determined from the detection result in S620 whether the set 112 of portable telephone body is left behind within the sales storing box (S621), and if not left behind, the contract sale terminates (S622). If takeout failure is detected as a result of detection in S621, the sales storing box is locked according to directions from the operator of the store management center (S623). Information (the number of sold units, sold model names, dates, store names, etc.) about completed contract sale transactions is sent to the sales management center 32 over the network 36 (S624), and the initial screen shown in FIG. 4 is displayed again (S625). Herein, after the contract, although the password of the purchased portable telephone is already set, if desired, in that place, the password can be changed by connecting the portable telephone connecting cable 109.

Next, referring to FIG. 9, a description will be made of how processing is performed when model change is selected on the initial screen. First, it is judged whether model change is selected (S626). As shown in the screen example 409 of FIG. 4, a model to change to is selected (S627). In the screen example 426 of FIG. 4, a manned store in which to change a model is selected (S628). A reservation application bill of model change reservation is printed in the certificate issuance part 106 and provided as a copy for the user (S629).

If fee plan change is selected as a result of judgment in S626, the fee plan change screen 423 in FIG. 4 is displayed for selection of a fee plan (S630). To identify whether the user is the owner of the portable telephone, the screens 424 and 425 are displayed to prompt the user to enter a portable telephone number and a password, respectively (S631). The user confirms the fee plan displayed on the screen 427 in FIG. 4 (S632). The contents of a changed fee plan are printed in the certificate issuance part 106 and provided as a copy for the user (S633). The change contents are sent to the sales management center (S624).

Figure 10:
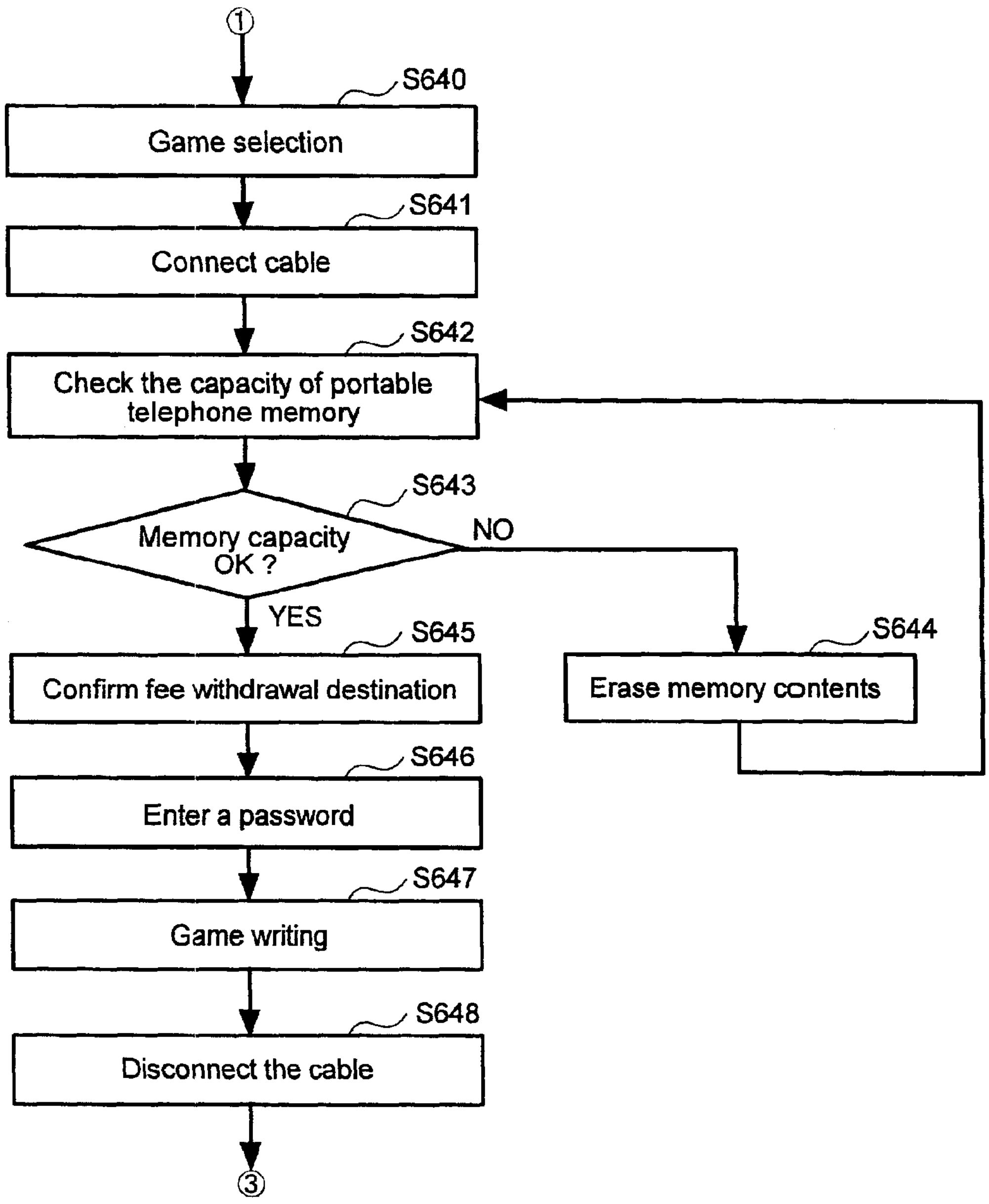
FIG. 10 is a flowchart of game sale processing performed by an automatic vending apparatus with automatic contract function.

FIG. 10 is a flowchart of processing performed when the Game button is pressed in S600 of FIG. 8. In S640, the screens 431 and 432 of FIG. 4 are displayed and the user selects a game to be downloaded to the internal memory of portable telephone. Next, according to directions of the screen 433 shown in FIG. 4, the portable telephone connecting cable 109 is connected to the user's portable telephone (S641). Next, the screen example 434 is displayed, and the capacity of free space of internal memory and a portable telephone number of a portable telephone carried with the user are checked by the portable telephone connection control part 208 through the portable telephone connecting cable 109 (S642). If a memory capacity checked in S645 is larger than the capacity of the game to be written, since the game can be downloaded, control proceeds to S645. If the memory capacity is insufficient, the screen 441 is displayed to have the user erase the memory of portable telephone under user's responsibility, then memory capacity is checked again (S644). The confirmation that the game fee is demanded to a fee demand destination based on the portable telephone number checked at the same as the memory capacity checking in S642 is made on the screen example 435 (S645). To authenticate the user, the entry of a password is made on the screen example 436 of FIG. 4 (S646). If the password is correct, the screen example 437 is displayed to download the game (S647). Upon completion of the downloading, as shown in the screen example 438, the user is prompted to disconnect the portable telephone connecting cable (S648). Sales information is sent to the sales management center (S624), the initial screen is displayed, and the processing terminates. To execute the game downloaded to the internal memory or IC card 703 over the portable telephone 700, the display screen 706 of the portable telephone must be used.

Figure 11:
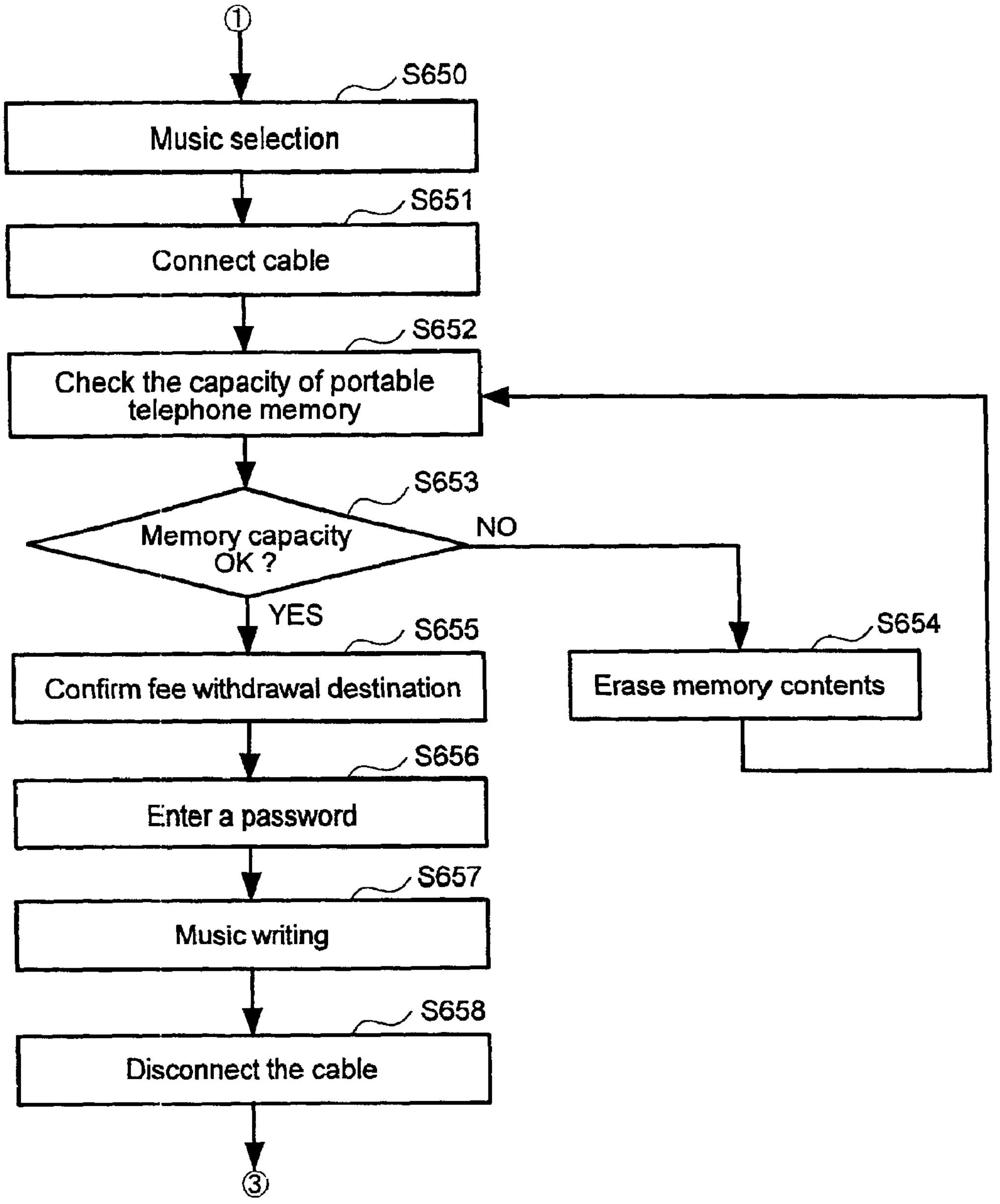
FIG. 11 is a flowchart of music sale processing performed by an automatic vending apparatus with automatic contract function.

FIG. 11 is a processing flowchart when music is selected in S600. Processing from S650 to S658 is the same as processing from S640 to S648 of FIG. 10, except that contents to be downloaded are music; a description of it is omitted.

Next, a second embodiment example of using an IC card for a new contract will be described below.

Figure 12:
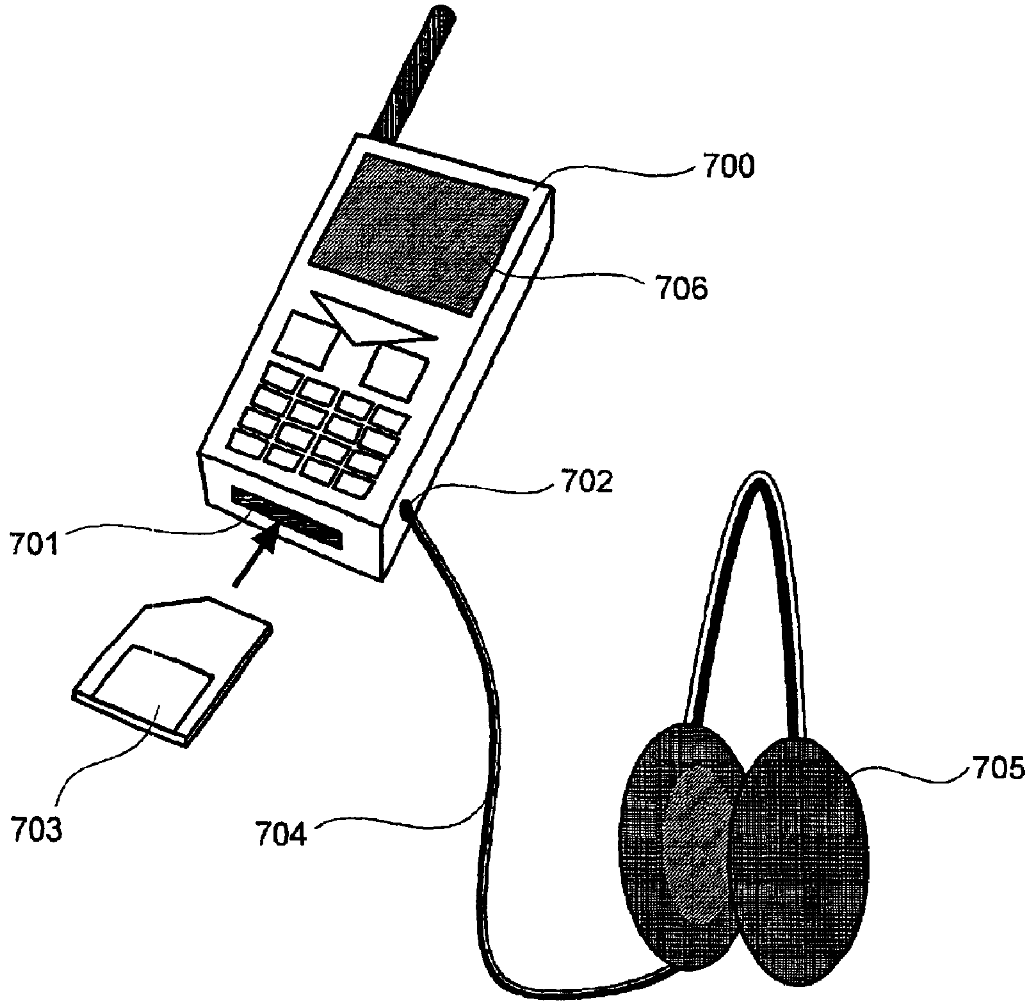
FIG. 12 is a drawing showing a portable telephone that performs services upon insertion of an IC card to which music data and personal data are written.

FIG. 12 is a drawing showing a portable telephone into which an IC card can be inserted and which can reproduce music and the like recorded in the IC card. A reference numeral 700 designates a portable telephone body; 701, an insertion port through which the IC card is inserted; 702, an earphone jack for connecting with a headphone for reproducing music; 703, an IC card capable of recording music data and personal information; 704, a connecting cable for connecting the earphone jack and the headphone; 705, the headphone for listening to music; and 706, a display screen for displaying the functions of the portable telephone and enjoying game and the like recorded in the IC card.

Figure 13:
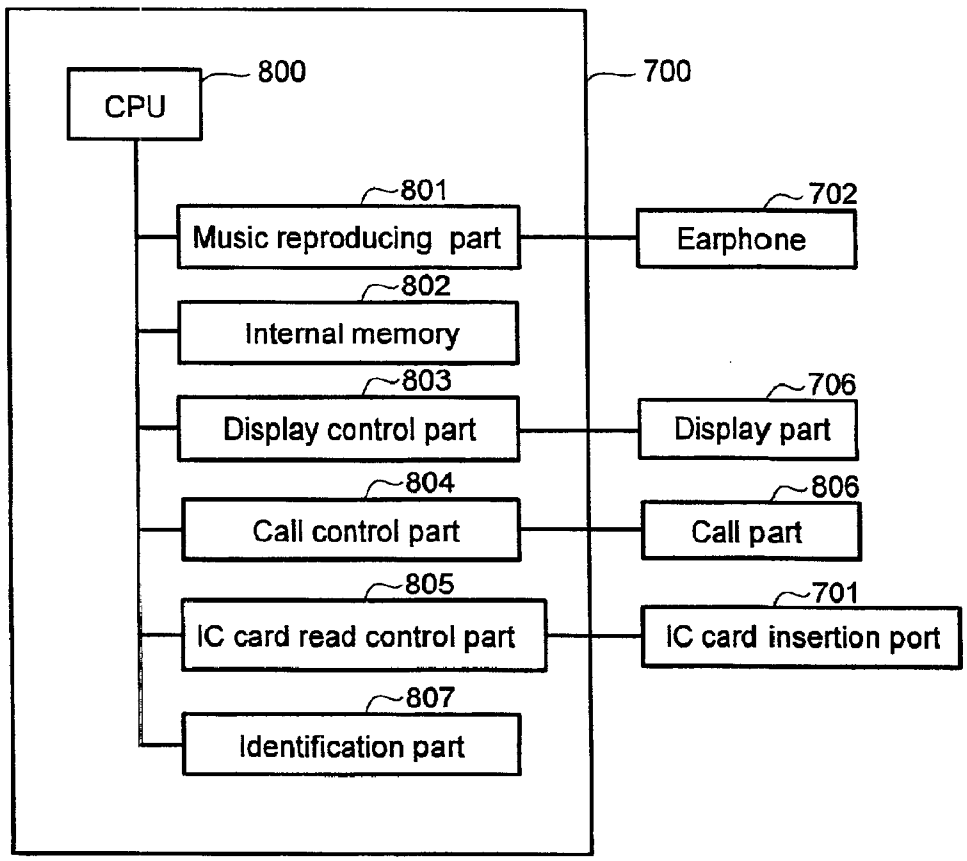
FIG. 13 is a drawing showing the internal structure of a portable telephone supporting an IC card.

FIG. 13 is a drawing for explaining the internal configuration of a portable telephone supporting IC card. CPU 800 controls the overall portable telephone; a music reproducing part 801, an apparatus for reproducing music data recorded in an IC card or the like, controls the earphone jack 702; an internal memory 802 records data required to control the portable telephone, music data, and the like; a display control part 803 controls the display of the display part 706; a call control part 804 controls a call part 806 for calling; an IC card read control part 805 reads the IC card inserted through the insertion port 701; and the identification part 807 identifies the correctness of information recorded in the IC card and judges whether the IC card is usable.

A second embodiment example in a new contract and model change of a portable telephone by use of an IC card will be described below with reference to FIGS. 14, 15, 16, and 17. A procedure for making a contract for portable telephone in the second embodiment example is the same as that in the first embodiment example, in the screens 403 to 406 of FIG. 4, and S602 to S608 in the flowchart of FIG. 8, which are omitted from the following description. A difference from the first embodiment example is that an IC card in which contract contents and personal information are recorded is issued after a contract was made by an apparatus of the present invention, and a portable telephone contract and contract content change are enabled by only the issuance of an IC card or a change of the contents of the IC card.

Figure 14:
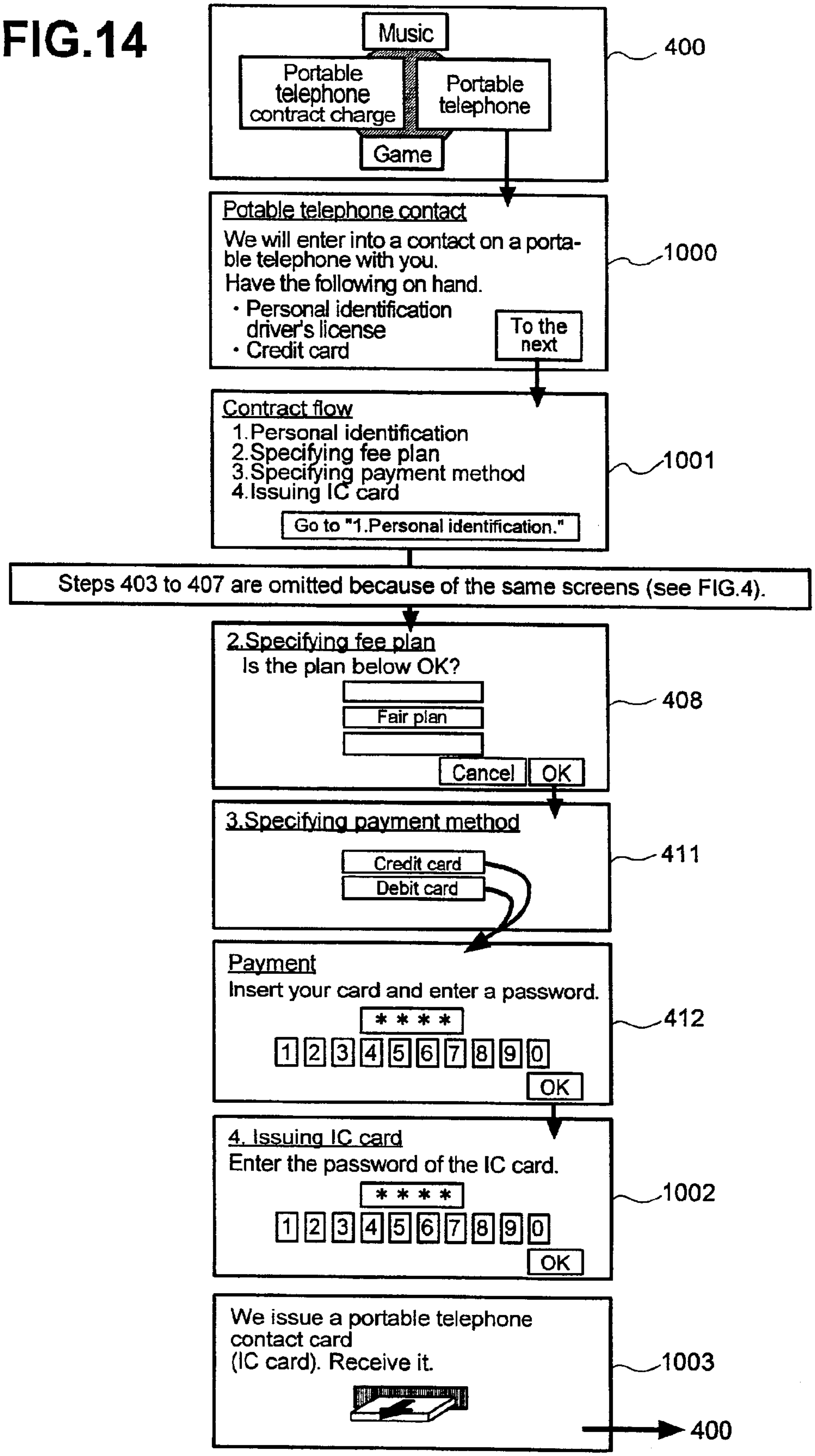
FIG. 14 is a drawing showing the transition of display screens for new contract by use of an IC card.

The second embodiment example of a new contract will be described. An initial screen 400 of FIG. 14 is a screen for making a new contract for a portable telephone. On a screen 1000, it is checked whether things necessary for the new contract are provided. On a screen 1001, the flow of the contract is described. Display screens from personal identification to the output of checking results from the credit check center are the same as the screens 403 to 407 of FIG. 4. After personal identification and the output of checking results from the credit check center, a fee plan is specified on the screen 408. A payment method (credit or debit) is specified on the screen 411 and a card password is entered on the screen 412. An IC card password is entered on a screen 1002. The password is necessary when receiving portable telephone services. On a screen 1003, contractor information such as contract contents, a portable telephone number, a fee withdrawal destination, and a name entered by an automatic vending apparatus is recorded in the IC card 703 (can be inserted in the insertion port 701 of the portable telephone 700), using the IC card part 110.

As has been described above, in an automatic vending apparatus involving contract of the present invention, by recording personal information and other information in the IC card 703, a portable telephone number need not be recorded in the internal memory of the portable telephone. As a result, by inserting the IC card 703 issued at the time of contract of the portable telephone in the insertion port 701 of the purchased portable telephone 700, the user of the portable telephone can be authenticated. In short, if the IC card 703 is provided, by replacing the IC card, a portable telephone of a new model becomes usable.

Although it is possible to issue an IC card and purchase a portable telephone body by a contract apparatus of the present invention, it is also possible to issue an IC card only, and purchase a portable telephone body in an electric store and enable it by inserting the IC card.

Figure 15:
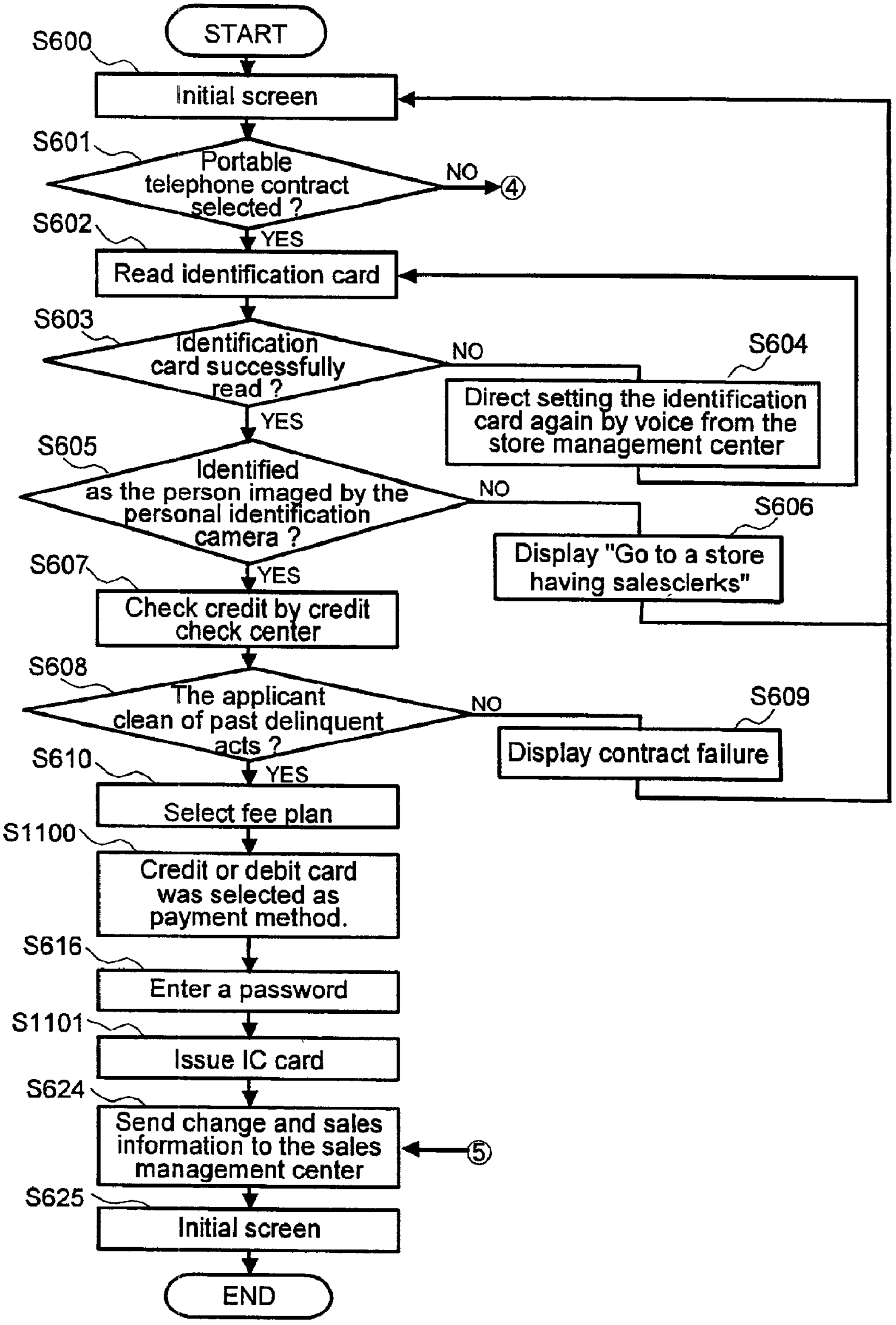
FIG. 15 is a flowchart showing new contract processing by use of an IC card.

Referring to a flowchart of FIG. 15, a description will be made of the flow of processing of a new contract by use of an IC card.

When new contract is selected on the initial screen 400 (S601), personal identification and credit checking for the contract are performed (S602 to S608). After the personal identification and credit checking, a fee plan is selected on the fee plan selection screen 408 (S610). A payment method is specified on the payment method selection screen 411 (S1100), the password of a payment card is entered on the password input screen 412, and the password of an IC card is entered on the password input screen 1002 (S616). Upon completion of payment processing, an IC card in which contract information and personal information are recorded is issued (S1101). After the new contract is completed, sales information is sent to the sales management center (S624), processing terminates, and the initial screen 400 is displayed.

Figure 16:
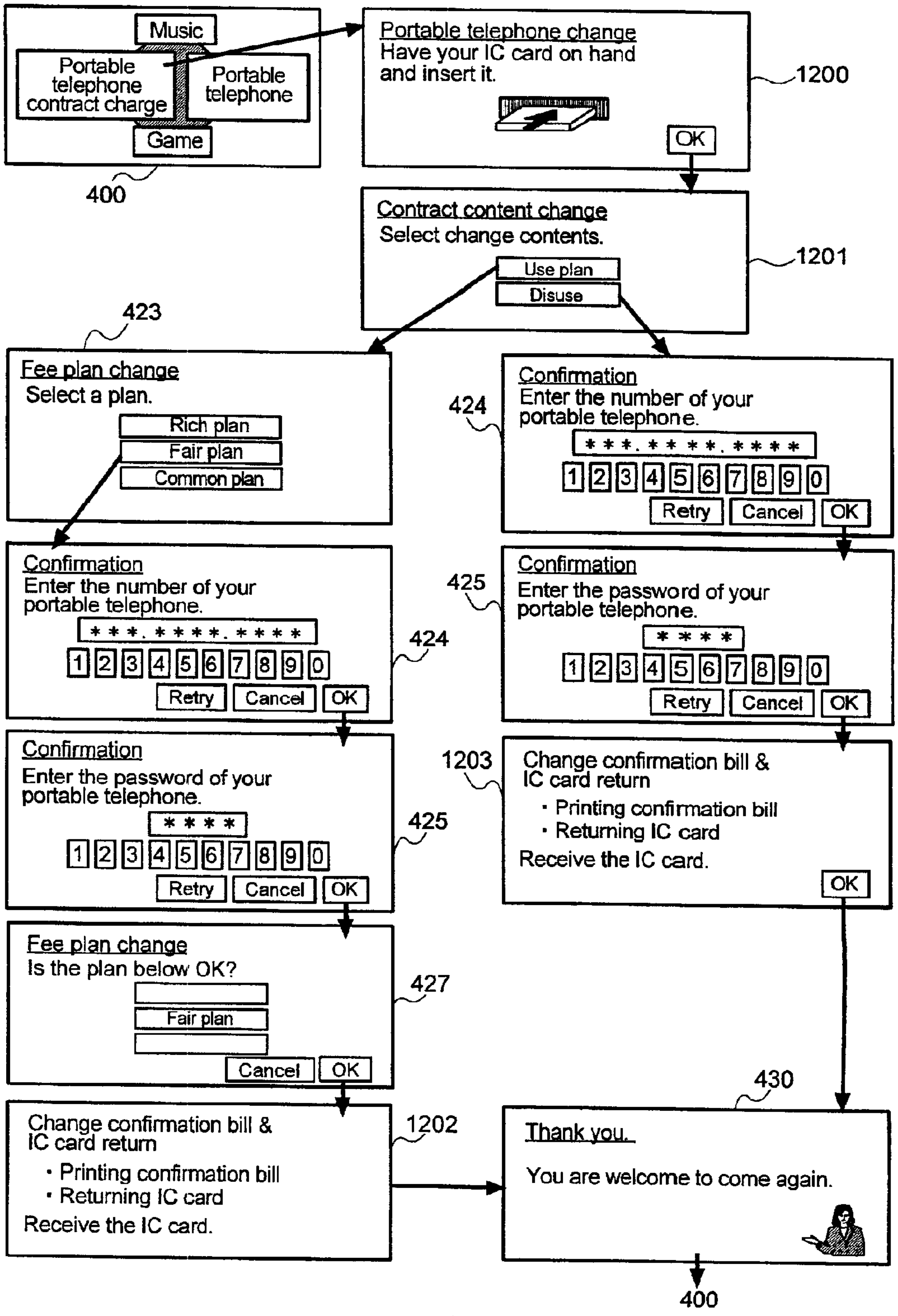
FIG. 16 is a drawing showing the transition of display screens for contract change by use of an IC card.
Figure 17:
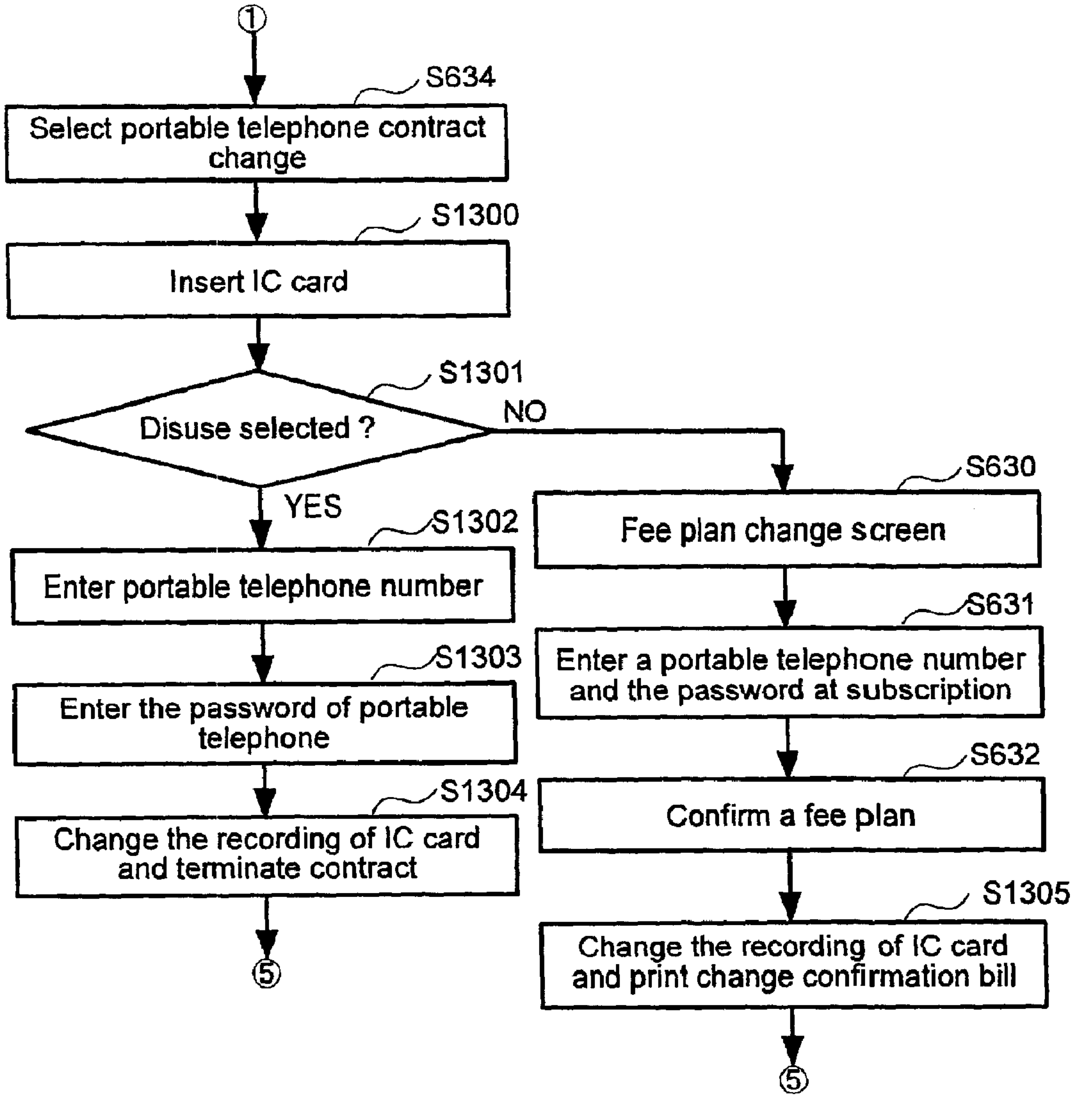
FIG. 17 is a flowchart showing contract change processing by use of an IC card.

A second embodiment at the time of contract content change is described below with reference to FIGS. 16 and 17. On the initial screen 400, "Portable telephone contract change" is selected. To change contract contents recorded in an IC card, the user is prompted to insert the IC card 703 on a screen 1200. On a change content selection screen 1201, fee plan change or disuse is selected. On the fee plan change screen 423, a fee plan is changed. In this example, "Fair plan" is selected. To prevent meaningless changes by third parties, the user is prompted to enter a telephone number and a password on the screens 424 and 425. Where the input results are correct, the change confirmation screen 427 is displayed, and if the change contents are correct, the user presses the OK button. Upon completion of the change, a screen 1202 is displayed, and a copy of the change contents and the IC card are returned to the user. At termination of all processing, the screen 430 is displayed and control is returned to the initial screen 400.

A description will be made of how processing is performed when disuse is selected on the change content selection screen 1201. As at the fee plan change, to prevent meaningless changes by third parties, the user is prompted to enter a telephone number and a password on the screens 424 and 425. Where the input results are correct, a screen 1203 for confirming contract termination is displayed and information recorded in the IC card is changed. The changed IC card is returned to the owner, the screen 430 is displayed, and control is returned to the initial screen 400.

A description will be made of a flowchart for portable telephone contract change shown in FIG. 17. When present invention contract change is selected on the initial screen 400 (S634), since contract change involves a change of IC card recording, on a screen 1200, the user is prompted to insert an IC card (S1300). Where "Disuse" is selected on the change menu selection screen 423 (S1301), to authenticate the user, the user enters the telephone number of a portable telephone to be disused (S1302) and a password (S1303). When the entered numbers are correct, the recording of the IC card is changed to disuse and the contract is terminated (S1304). Contract termination information is sent to the sales management center (S624), the initial screen is displayed, and the processing terminates.

Where "Fee plan" is selected on the change menu selection screen 423 (S1301), a fee plan is selected on the fee plan change screen 423 (S630). As at the disuse processing, to authenticate the user, the user enters a portable telephone number and a password (S631). If the input results are correct, a changed free plan is displayed on the screen 427 and the change contents are confirmed (S632). If the change contents are correct, the user presses the OK button on the screen 427, the recording of the IC card is changed, and a change confirmation bill is printed in the certificate issuance part 106 (S1305). The change contents are sent to the sales management center (S624), the initial screen is displayed, and the processing terminates.

In the new contract and the contract content change, where personal information and other information are already written to the IC card 703, changes are made possible in that place by partially changing the IC card information. Also, in the case where a new portable telephone body is purchased, calls are made possible by inserting the IC card 703 in which information is recorded, to the insertion port 701 of the new portable telephone 700. Furthermore, in the case of model change, by inserting the IC card in a new model in place of an old one, the new model becomes readily usable. In this case, the new portable telephone body can be purchased without contract in a mass retailer.

As a second embodiment of writing game and music to the internal memory of portable telephone, processing of writing game and music to an IC card will be described with reference to display screens of FIG. 18 and a flowchart of FIG. 19.

Figure 18:
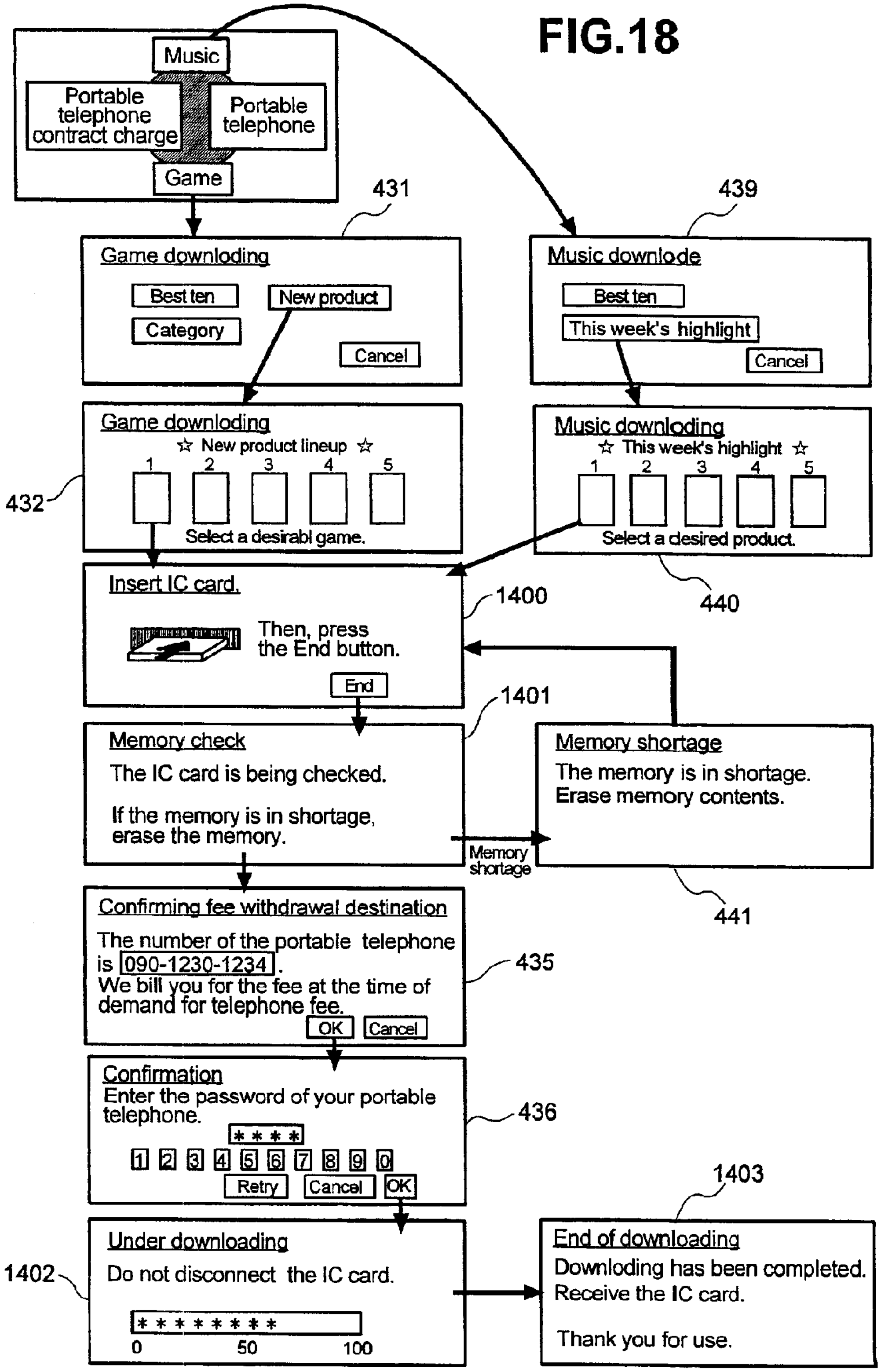
FIG. 18 is a drawing showing the transition of display screens for game or music purchase by use of an IC card.

When game is selected on the initial screen 400, a initial screen 431 of FIG. 18 for game downloading is displayed. Herein, "New product" is selected. The user selects a desired one of games displayed on the screen 432. For music, the screens 439 and 440 are used to select and download a desired music product; since, after a desired music product is selected, the same display screens as for game downloading are used, an example of game downloading is described below. To download game to an IC card, on a screen 1400, the user is prompted to insert the IC card to the IC card part 110. After the IC card has been inserted, a screen 1401 is displayed to check a free memory of the IC card. If the memory is in shortage, the screen 441 is displayed to tell the user that the memory is in shortage, and prompts the user to erase memory contents, and control returns to the screen 1400. If the memory capacity is sufficient, to confirm that the fee may be withdrawn from the same account for portable telephone call fees, the portable telephone number is displayed for confirmation on the screen 435. When the OK button is pressed, to authenticate the user, the user is prompted to enter a password on the screen 436. If the password is correct, the game is downloaded to the IC card. A screen 1402 is displayed for the duration of downloading and the user can check the status of downloading. Upon completion of downloading, a screen 1403 is displayed, the IC card is ejected, and the user is prompted to receive the IC card. After the downloading is completed and the user takes out the IC card, the initial screen 400 is displayed.

Figure 19:
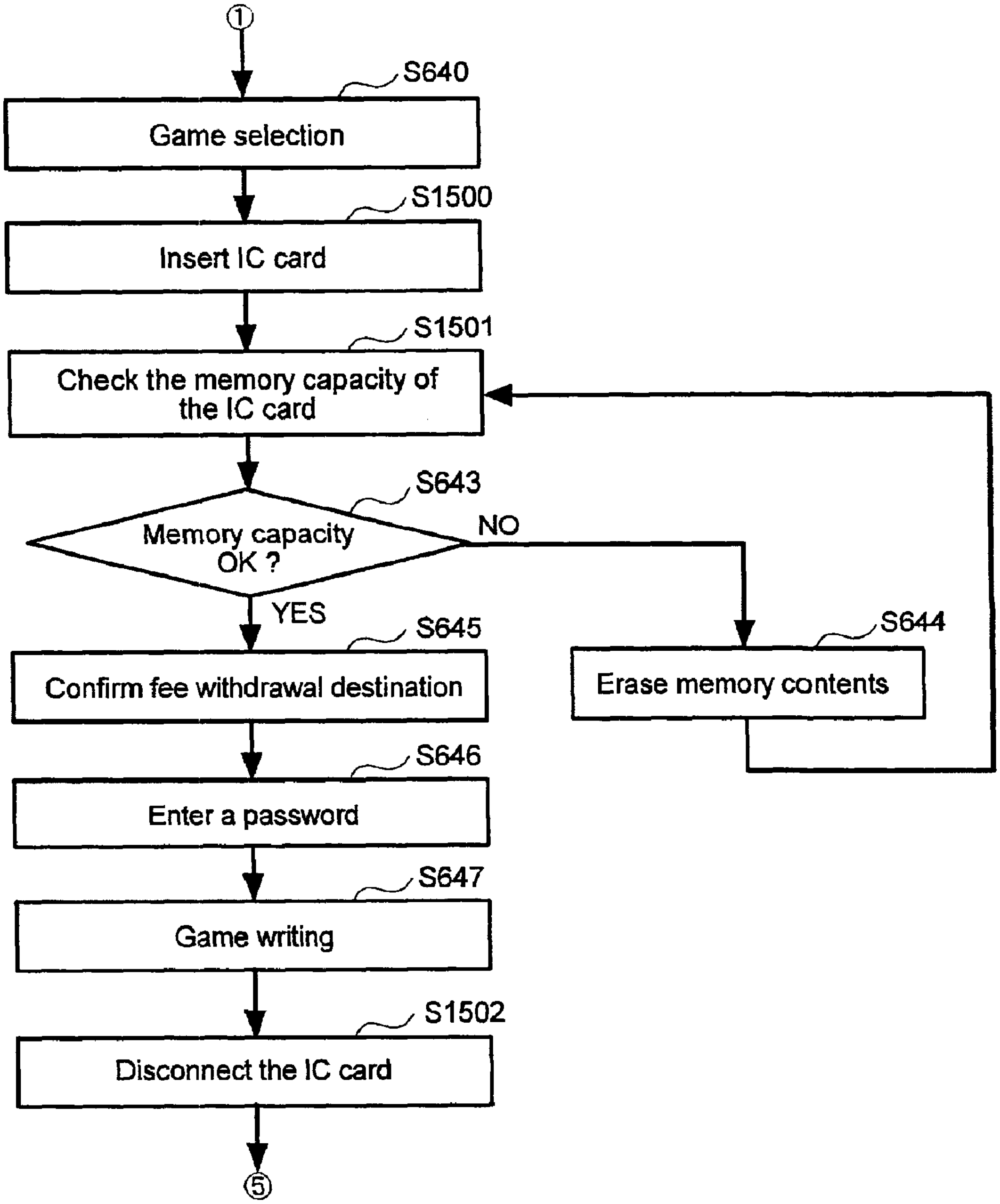
FIG. 19 is a flowchart showing game purchase by use of an IC card.

FIG. 19 is a flowchart showing the flow of actual processing. Herein, as a typical example, game downloading is described below with reference to the flowchart. Music downloading is omitted because it is the same as game downloading, except for music selection at the first step. After game is selected through the screens 431 and 432 (S640), the user inserts the IC card 703 for portable telephone to the IC card part 110 to download a game (S1500). The free space capacity of the inserted IC card 703 is checked (S1501), and if the free space capacity of the memory is smaller than a memory capacity required for the selected game (S643), memory shortage is displayed on the screen 411 and other contents recorded in the IC card 703 are erased (S644). After erasure, memory capacity is checked again (S643). If the free space capacity of the memory is larger than a memory capacity required for the selected game, an account for paying the fame fee is confirmed. In this example, to use the same account as the monthly call fee destination, a portable telephone number is displayed for confirmation (S645). Furthermore, to prevent illegal use by third parties, the user enters the password of the portable telephone (S646). If the password is correct, the game is downloaded to the IC card 703 (S647). After the termination of the downloading, the IC card is ejected from the IC card part 110, the IC card is received (S1502), sales information is sent to the sales management center (S624), the initial screen is displayed, and the processing terminates.

To listen to music downloaded to the internal memory or the IC card 703 over the portable telephone 700, the cable 704 having a terminal of the headphone 705 must be plugged in the earphone jack 702.

Next, to describe the invention of, after purchasing a product involving contract, updating only the product without changing contract contents, a third embodiment example of changing a model of portable telephone is described. Hereinafter, the embodiment of the third embodiment example is described below.

Figure 20:
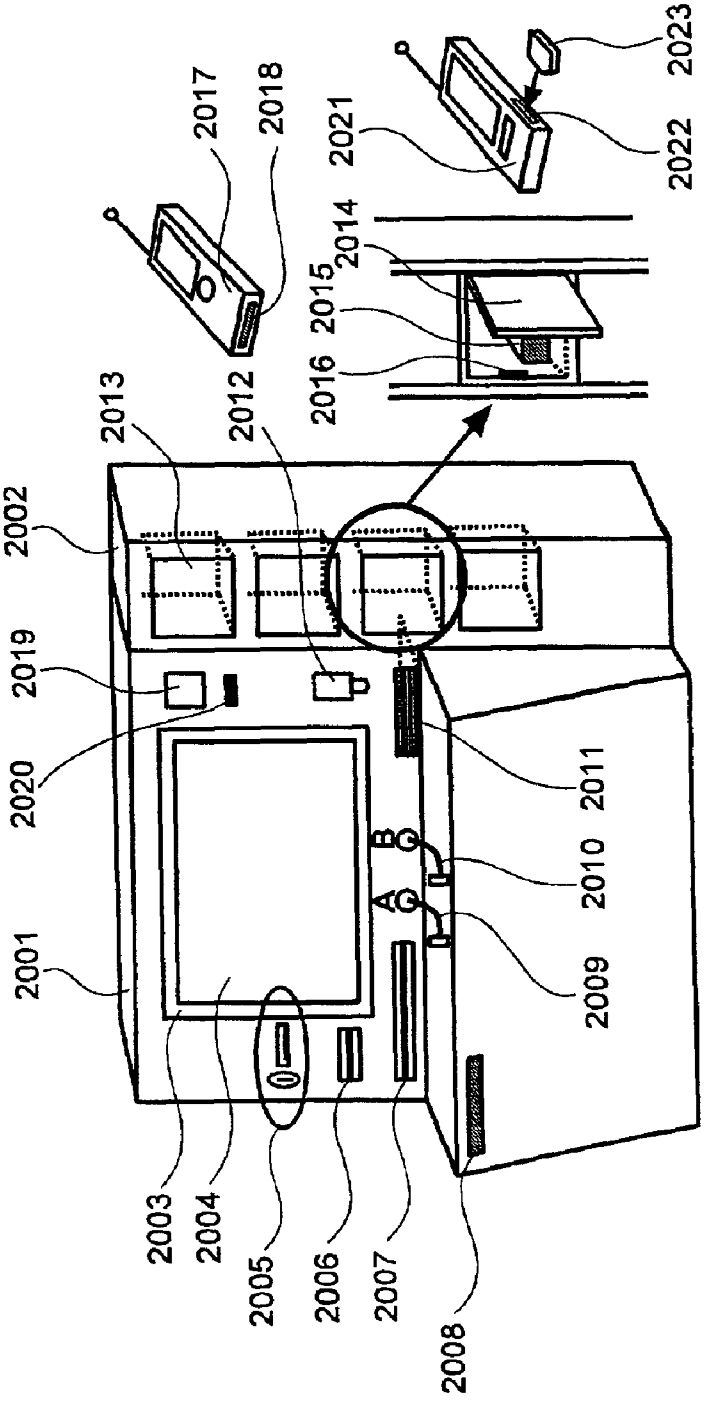
FIG. 20 is a drawing showing an automatic contract change apparatus according to an embodiment of the present invention.

FIG. 20 is a drawing showing an automatic model changing apparatus according to an embodiment of the present invention. In FIG. 20, a reference numeral 2001 designates a model change part of the automatic model changing apparatus; 2002, a storing part to store a new product for product updating; 2003, a display part of the model change part 2001; 2004, an input part such as a touch panel, formed on the display part 2003; 2005, a cash part for entering cash at the time of purchase of a product; 2006, a magnetic card read part for paying a fee by a credit card or the like at the time of purchase of a product; 2007, a papers issuance part for printing the format of a contract content change bill written at the time of change of contract contents; 2008, a papers collection part for collecting a contract content change bill and the like; 2009, a connecting cable A for exchanging information through an input-output terminal of a product before change; 2010, a connecting cable B for exchanging information through an input-output terminal of a product after change; 2011, a paper set part on which paper is set to obtain the image of a written contract content change bill; 2012, a shooting part for obtaining the image of a contract content change bill to have a service center check whether it is correctly written; 2013, product storing boxes to store new products; 2014, the doors of the sales storing boxes controlled in opening and closing by an electronic lock; 2015, a product stored in a sales storing box; 2016, an electronic lock; 2017, a portable telephone of a product example, taken out of a box; 2018, a connecting terminal of the portable telephone; 2019, a speaker; 2020, a memory card issuance part for storing and issuing a memory card or the like used in the product example; 2021, a portable telephone supporting a memory card of a product example; 2022, a memory card insertion port of the portable telephone supporting a memory card; and 2023, a memory card capable of recording a portable telephone number, ID information, and contractor information.

Figure 21:
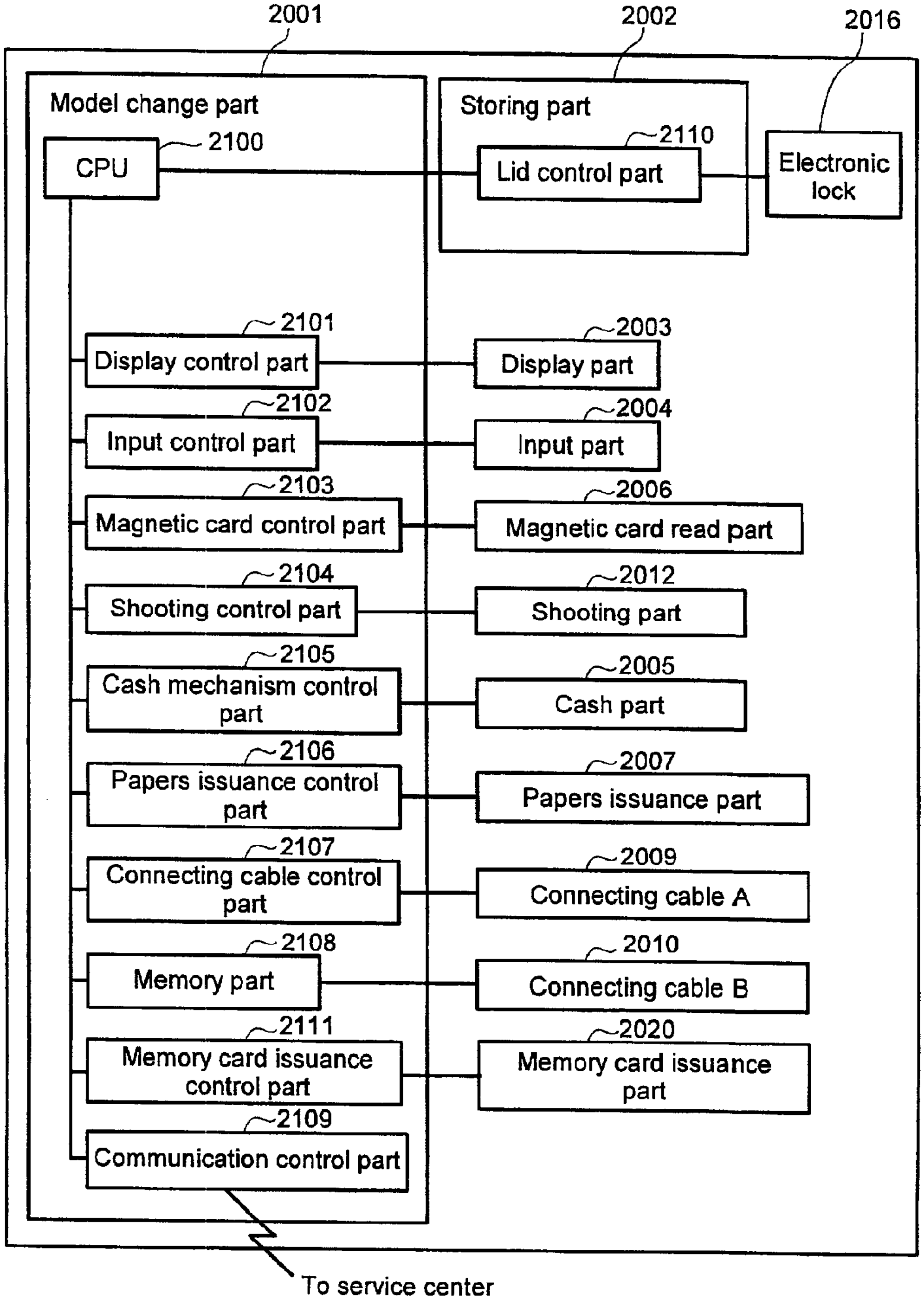
FIG. 21 is a drawing showing the internal structure of an automatic contract change apparatus.

FIGS. 21 and 22 are drawings for explaining the internal structures of the model change part 2001, storing part 2002, and portable telephone 2017 of a product example. FIG. 21 shows the internal structures of the model change part 2001 and storing part 2002, and a reference numeral 2100 is a CPU, which controls the model change part 2001 and the storing part 2002. 2101 designates a display control part for controlling the display of the display part 2003; 2102, an input control part for controlling information from the input part 2004 such as a touch panel; 2103, a magnetic card control part for controlling the magnetic card read part 2006; 2104, a shooting control part for controlling the shooting part 2012; 2105, a cash mechanism control part for controlling the cash part 2005; 2106, a papers issuance control part for controlling the papers issuance part 2007; 2107, a connecting cable control part for controlling the connecting cables A and B; 2108, a memory part for storing product stock information and other information; 2109, a communication control part for communicating with the outside; 2110, a lid control part for controlling the electronic lock 2016 and controlling the opening and closing of a door specified by the CPU 2100; and 2111, a memory card issuance control part for controlling the memory card issuance part 2020 for issuing a memory card or the like.

FIG. 22 shows the internal structures of the portable telephone 2017 of a product example and the portable telephone 2021 supporting a memory card of a product example. In the portable telephone 2017 of a product example, 2200 designates the internal memory in which ID information specific to the portable telephone, user's phone book information, and the like are recorded; 2201, the portable telephone CPU that controls the overall portable telephone of a product example; 2202, a portable telephone display part in which a call partner's telephone number and other information are displayed; 2203, a call part for making phone calls; and 2204, a communication part for sending call voice and the like. In the portable telephone 2021 supporting a memory card of a product example, 2205 designates the CPU of the portable telephone supporting a memory card that controls the overall portable telephone supporting a memory card of a product example; 2206, a display part of the portable telephone supporting a memory card in which a call partner's telephone number and other information are displayed; 2207, the internal memory of the portable telephone supporting a memory card in which control information for controlling the portable telephone and other information are recorded; 2208, a call part of the portable telephone supporting a memory card, for making phone calls; and 2209, a communication part of the portable telephone supporting a memory card, for sending call voice and the like.

FIG. 23 is a drawing showing the configuration of the overall system. Automatic contract change apparatuses installed in unmanned stores and manned stores are connected to a service center 2300 over a network 2301 such as ISDN. The service center 2300 receives papers the images of completed change application bills and the like from automatic change apparatuses over the network 2301 (2302), and the operator checks for entry omissions. If entry omissions are found in the change application bills, the operator sends voice information indicative of modifications to the automatic contract change apparatuses over the network 2301 (2303). The service center 2300 keeps track of stock information of the storing part 2002 and issues a replenishment request.

FIG. 24 is a drawing showing the data structure of stock information recorded in the memory part 2108 of an automatic contract change apparatus comprising the mode change part 2001 and the storing part 2002. In FIG. 24, a reference numeral 2400 designates the respective box names of the product storing boxes 2013; 2401, stock information (unit count data) corresponding to 2400; 2402, model names of portable telephone; and 2403, a symbol indicating the end of data.

Figure 25:
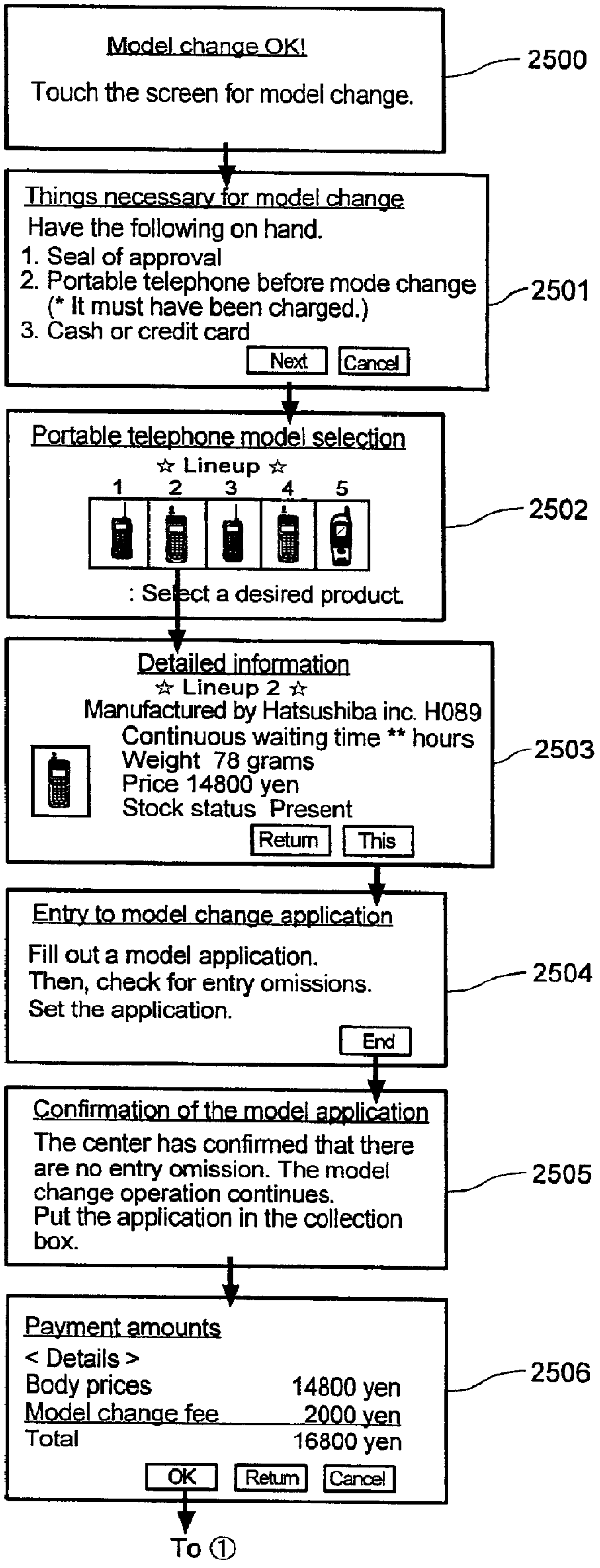
FIG. 25 is a drawing showing the transition of display screens in a third embodiment example.
Figure 26:
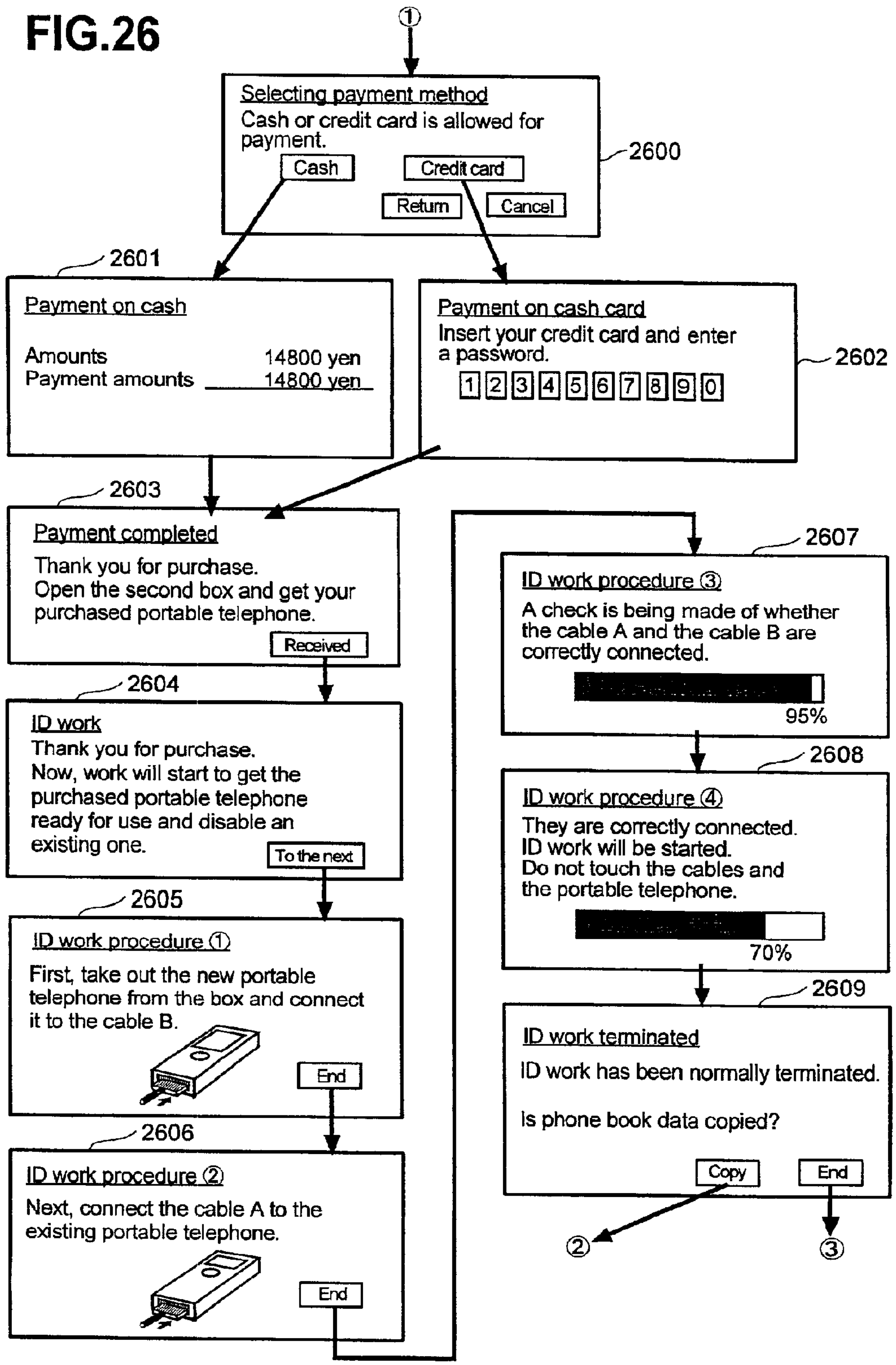
FIG. 26 is a drawing showing the transition of display screens in a third embodiment example.
Figure 27:
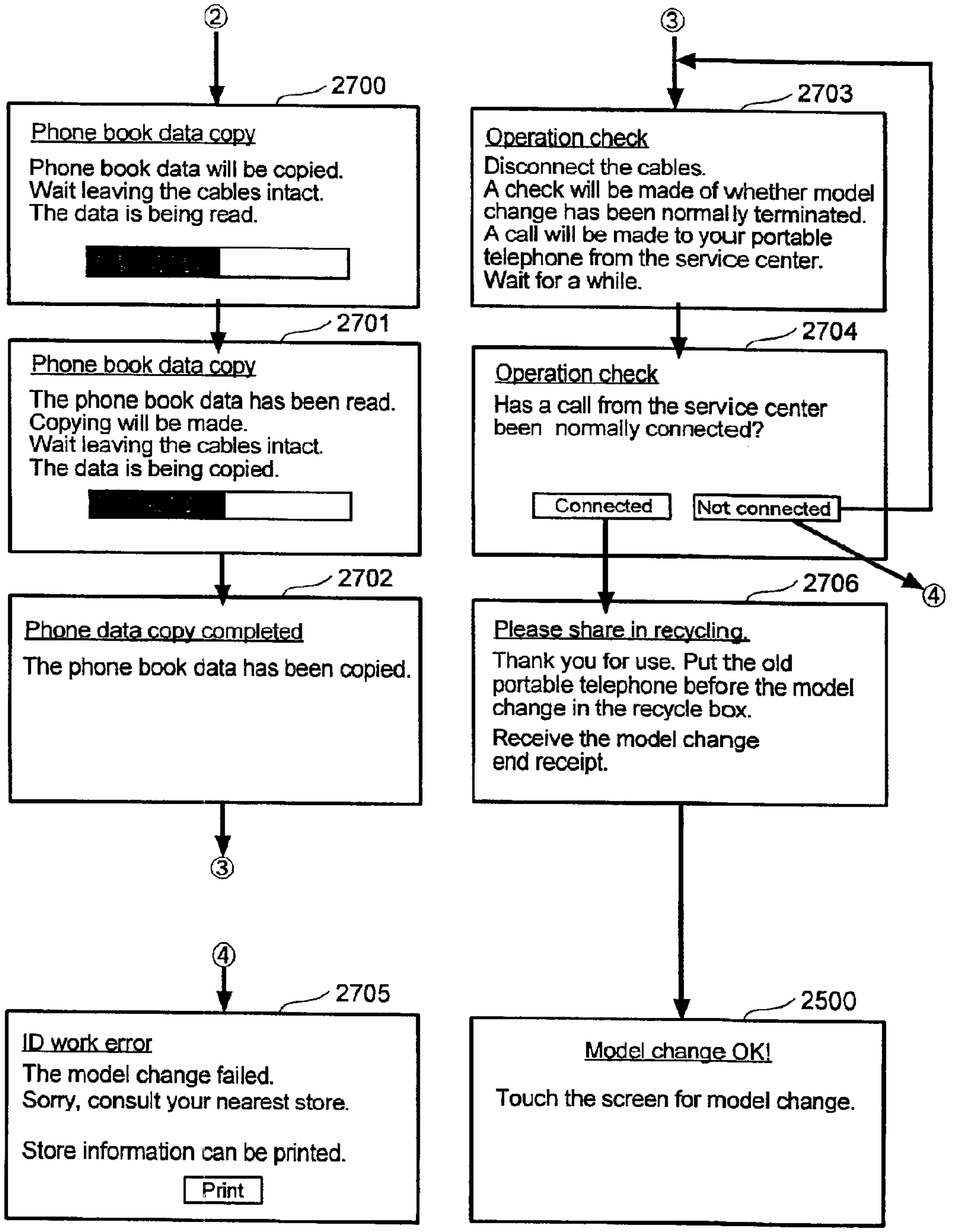
FIG. 27 is a drawing showing the transition of display screens in a third embodiment example.

Referring to FIGS. 25 to 27 showing screen transitions, FIG. 20 showing a hardware configuration, FIGS. 21 and 22 showing internal configurations, and FIG. 23 showing a system configuration, a description will be made, based on screen transitions, of the process of portable telephone model change by use of an automatic contract change apparatus according to the embodiment of a third embodiment example of the present invention.

FIGS. 25 to 27 are drawings showing the transition of display screens controlled and displayed on the display part 2003 by the display control part 2101. Hereinafter, input is made to screens through the input part 2004 controlled by the input control part 2102. In FIGS. 25 to 27, 2500 designates an initial screen, which displays the message of "Touch the screen for model change". 2501 designates an advance confirmation screen, displayed when the user presses the input part 2004, for confirming things necessary for model change, which has the user check whether he has on hand things necessary for model change, such as a portable telephone currently used and seal of approval. When "Next" is pressed on the screen 2501, a screen 2502 is displayed to have the user select a model to change to. In this screen, models in stock are circled. For the numbers of models to be judged to be in stock in the storing part 2002 from the table of FIG. 24, which indicates the status of stock in the storing part 2002, product numbers displayed in the display part by the display control part 2101 are circled so that the user can select one of models in stock. A screen 2503, displayed when a model to change to is selected on the screen 2502, describes in detail the selected model. A screen 2504, displayed when a model to change to is decided by pressing a "This" button on the screen 2503, prompts the user to fill out a model change application issued from the papers issuance part 2007 controlled by the papers issuance control part 2106 and set the written application in a specified position. A screen 2505 is displayed when it is confirmed by the service center 2300 that the application is correctly filled out. That is, the model application is filled out and set in the paper set part 2011, and the image of the application is obtained using the shooting part 2012 controlled by the shooting control part 2104. The obtained image is sent to the service center 2300 over the network 2301 by the communication control part (2302). The screen 2505 is displayed when the service center 2300 checks the application for entry omissions and confirms that it is correctly filled out. A screen 2506 displays details of a cost required for the model change. A screen 2600 is displayed to have the user select cash or a credit card as a payment method. A screen 2601 is displayed when the user selects cash as a payment method and pays cash through the cash part 2005 controlled by the cash mechanism control part 2105. A screen 2602 prompts the user to enter the password of a credit card after the user selects a credit card as a payment method and inserts the credit card to the magnetic card read part 2006 controlled by the magnetic card control part 2103. A screen 2603 indicates the end of payment, and prompts the user to take a box storing a product 2015 (portable telephone) out of the product storing box 2013 of the storing part 2002 by opening the door 2014 of the product storing box for which an electronic lock 2016 controlled by the lid control part 2110 is unlocked. A screen 2604 is displayed when a portable telephone has been taken out of the product storing box 2013 and the Received button has been pressed, indicating that ID work for model change will be started. A screen 2605 shows the procedure for the ID work and prompts the user to connect a connecting cable B 2010 to the connecting cable 2018 of the portable telephone taken out of the box. A screen 2606 shows the procedure for the ID work and prompts the user to connect the connecting cable A 2009 to the connecting terminal 2018 of a portable telephone having been so far used. A screen 2607 is displayed when the connecting cable control part 2107 is checking whether the connecting cable A 2009 and the connecting cable B 2010 are correctly connected. A screen 2608 is displayed when the ID work is in progress. A screen 2609 indicates that the ID work has been normally terminated, displaying that, although the model change has terminated, the service of copying of phone book data can be provided. A screen 2700 is displayed when phone book data is being retrieved from the internal memory 2200 of the portable telephone having been so far used when the Copy button is pressed on the screen 2609. A screen 2701 is displayed when the phone book data obtained on the screen 2700 is being copied to the internal memory 2200 of the portable telephone to which to change a model. A screen 2702 indicates that the phone book data has been copied. A screen 2703 describes that, after termination of the ID work, a call will be made to the portable telephone having been subjected to the ID work to check whether the model change has been normally terminated. A screen 2704 requests the user to press "Connected" or "Not connected" button to determine whether a call from the service center has been normally received by the model-changed portable telephone. A screen 2705, displayed when the "Not connected" button is pressed on the screen 2704, describes failure in the model change and guides the user to a user's nearest manned store. At this time, information about a user's nearest manned store can be obtained by pressing a "Print" button. A screen 2706 is displayed when the "Connected" button is pressed on the screen 2704, and prompts the user to recycle the portable telephone having been so far used. After a certain period of time has elapsed, the initial screen 2500 is displayed.

Figure 28:
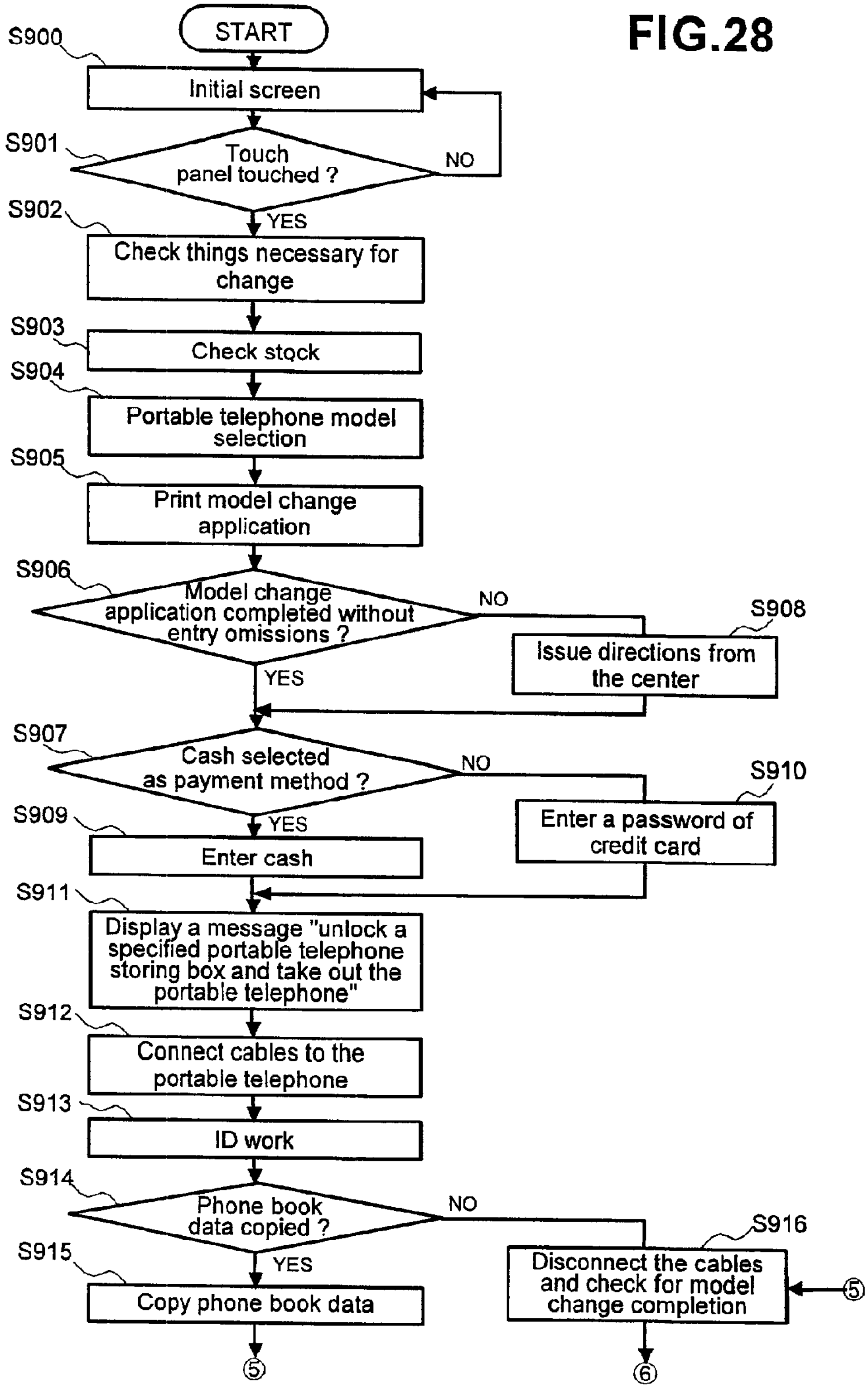
FIG. 28 is a flowchart showing processing of the third embodiment example.
Figure 29:
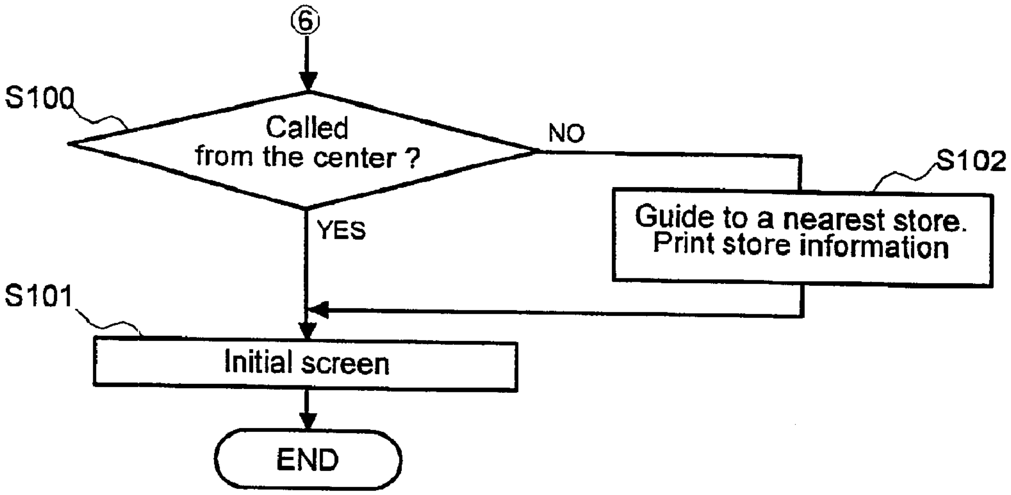
FIG. 29 is a flowchart showing processing of a third embodiment example.

FIG. 28 is a flowchart showing processing performed by an automatic contract change apparatus comprising the model change part 2001 and the storing part 2002 of the third embodiment example.

The initial screen 2500 stored in the memory part 2108 is displayed in the display part 2003 of the mode change part 2001 under control of the CPU 2100 (S900). Hereinafter, screens will be displayed in the display part 2003 of the model change part 2001. The user touches the input part 2004 to make a contract change of a product, that is, to change the model of portable telephone. The model change part 2001 judges whether the input part 2004 was touched (S901). The initial screen 2500 stays displayed as long as the input part 2004 is not touched. To check things necessary for the change, the screen 2501 of FIG. 25 is displayed (S902). The stock status of portable telephones stored in the product storing boxes 2013 of the storing part 2002 is obtained by consulting the stock information 2401 and the model names 2402 of portable telephone bodies in the table shown in FIG. 24 (S903), which are stored in the memory part 2108. A model to change to is selected by the user pressing the image of a desired model on the screen 2502. At this time, for models in stock, model numbers associated with the models, displayed on the display screen, are circled using the stock status obtained from the result of S903 (S904). After the user decides a model to change to by seeing detailed information about the model displayed on the screen 2503, a model change application to be filled out for model change is printed by the papers issuance part 2007 controlled by the papers issuance control part 2106 (S905), and the user fills out the printed application. The model change application is filled in according to directions displayed on the screen 2504, a seal of approval is pressed, the paper is set on the paper set part 2011, and the shooting part 2012 obtains the image of the model change application when "End" is pressed. The image is sent to an operator of the service center 2300 through the communication control part 2109 and the network 2301. The operator visually checks the sent image on the screen of a personal computer or the like (S906). If the model change application is imperfect because of entry omissions, failed image, or the like, the operator of the service center sends modification directions (voice information 2303) to the automatic contract change apparatus over the speaker 2019 or the like via the network 2301 (S908). As shown in the screen 2505, if it is confirmed that the model change application has been correctly filled out, the user is instructed to put the application in the papers collection box 2008. After "Purchase" button is pressed for details of purchase amounts displayed on the screen 2506, a payment method is selected on the screen 2600 (S907). Where cash is specified as a payment method, as shown in the screen 2601, payment is accepted until specified amounts are entered from the cash part 2005 (S909). Where a payment method is a credit card, the credit card is read by the magnetic card read part 2006 to obtain its magnetic information, and the magnetic information is sent to a credit card company over the network to check whether usable limit amounts are not exceeded. If there is no problem, input of a password is accepted as shown in the screen 2602, the password is sent to the credit card company, and payment by the credit card terminates at the time when a match is found (S910). Upon completion of payment, the screen 2603 is displayed to indicate the end of payment. At the completion of payment, the box of a product storing box 2013 in which the model selected by the user is stored is located based on the data structure as shown in FIG. 24. According to the information, the CPU 2100 of the model change part 2001 controls the lid control part 2110 of the storing part 2002, and unlocks the electronic lock 2016 of the located product storing box so that the user can open the door 2014 of the product storing box. As shown in the screen 2603, the user takes a product 2015 as the purchased portable telephone out of the specified product storing box 2013 in the storing part 2002 by opening the door 2014 of the product storing box (S911). After taking the portable telephone out of the box, the user presses the Received button on the screen 2603. At this time, the electronic lock 2016 of the box is locked. The screen 2604 is displayed to describe ID work for model change, and as shown in the screens 2605 and 2606, the connecting cable A 2009 is connected to the connecting terminal of the portable telephone having been so far used, the purchased portable telephone is taken out of the box, and the connecting cable B 2010 is connected to the connecting terminal of the new portable telephone (S912). As shown in the screen 2607, to determine whether the connecting cables A 2009 and B 2010 are correctly connected, the connecting cable control part 2107 checks whether it can see the internal memory 2200 through the cables from both the portable telephones. Herein, the shape of the connecting terminal may differ depending on manufacturers, and cables different in shape may not be connected. In this case, connecting cables A and B different for each shape and manufacturer are provided in advance in the model change part. That is, cables different for each of company A (connecting cable A, connecting cable B), company B (connecting cable C, connecting cable D), and company C (connecting cable E, connecting cable F) are provided in the model change part. Thereby, cables can be connected to portable telephones of different companies and types. A method of achieving this will be described later using FIGS. 35, 17, and 18 as a fifth embodiment example.

Through the cable A 2009 connected with the connecting terminal of the portable telephone having been so far used, ID information such as a portable telephone number is recorded in the memory part 2108, and then the contents of the internal memory of the portable telephone having been so far used are erased. The recorded portable telephone number and other information are copied to the internal memory 2200 of the new portable telephone through the connecting cable B 2010 connected to the connecting terminal of the portable telephone (S913). The screen 2608 is displayed in the display part. After the ID work has terminated normally, the screen 2609 is displayed to have the user select whether to terminate the processing or copy phone book data (S914). As shown in the screens 2700, 2701, and 2702, the phone book data is copied in the same procedure as that for the ID work in a manner that copies the internal memory of the portable telephone having been so far used to the internal memory of the new portable telephone (S915). It is to be understood that information important to the user such as phone book data should be copied to the service center as well via the memory part 2108 of the model change part and the network to provide for dropout of information during copy operation. Later claims to dropout of important information from users can be solved by keeping records, with increased usability. The screen 2703 is displayed to determine whether the ID work has terminated normally, that is, to check whether the model change has succeeded, by making a call to the model-changed portable telephone from the service center. If the new portable telephone is called, the model change is considered to terminate (S916). As shown in the screen 2704, if the portable telephone is called, the "Connected" button is pressed. If it is not called, the "Not connected" button is pressed (S100). If connected, a model change transaction statement for model change is printed in the papers issuance part 2007 controlled by the papers issuance control part 2106 and is used as a copy for the user. Further, an advertisement screen as shown by the screen 2706 is displayed and control returns to the initial screen 2500 (S101). Further, information (the number of sold units, sold model names, dates, store names, etc.) about completed model change transactions is sent to the service center 2300 over the network 2301. However, if not connected, the screen 2705 is displayed to output a message indicating that model change should be made again in a user s nearest manned store, and store information is printed in the papers issuance part 2007 controlled by the papers issuance control part 2106 (S102).

Hereinafter, as a fourth embodiment example, a description will be made of an automatic apparatus and business form for model-changing, using an automatic contract apparatus, a current portable telephone storing a portable telephone number, apparatus number, and other information in its internal memory to a portable telephone supporting a memory card in which these items of information are stored, by issuing the memory card.

Figure 30:
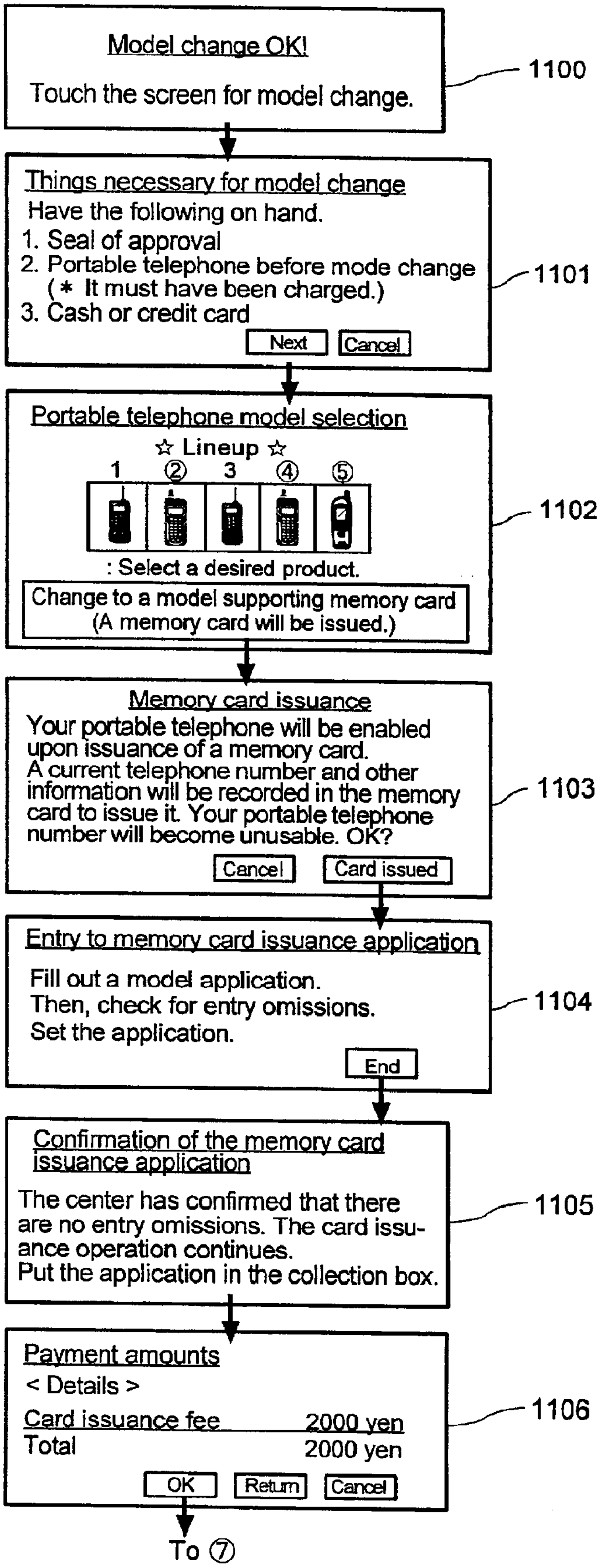
FIG. 30 is a drawing showing the transition of display screens in a fourth embodiment example.
Figure 31:
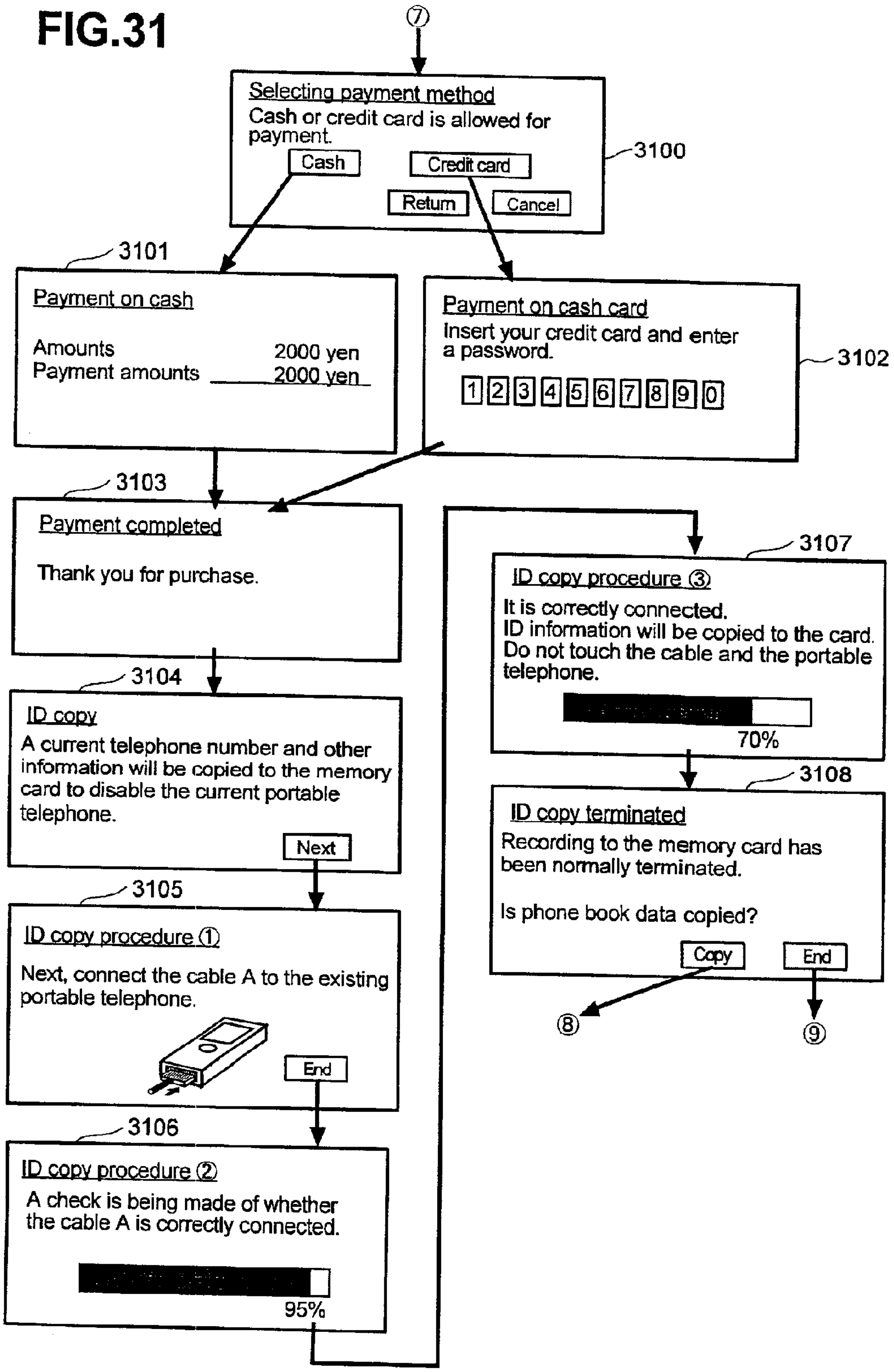
FIG. 31 is a drawing showing the transition of display screens in a fourth embodiment example.
Figure 32:
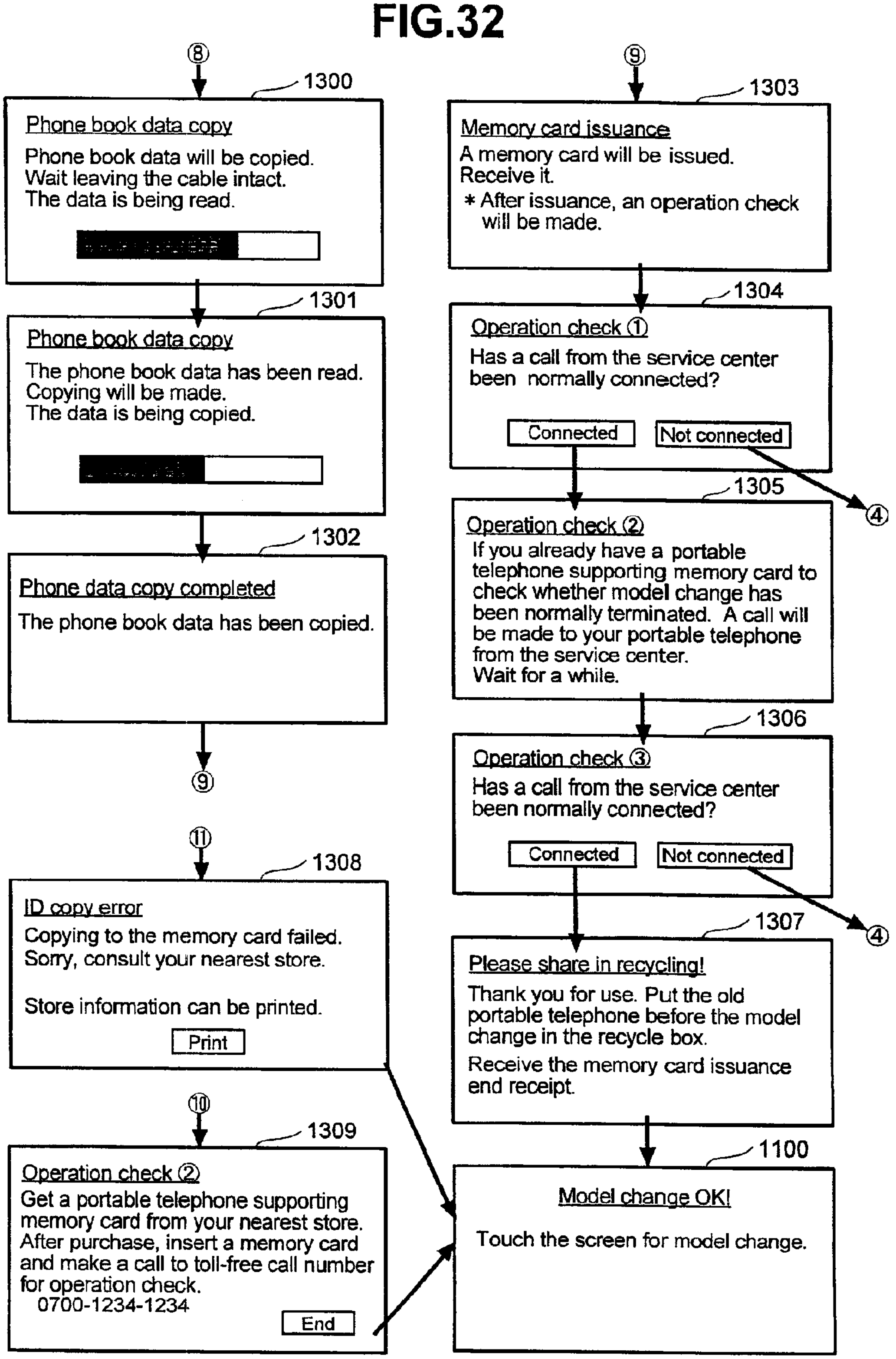
FIG. 32 is a drawing showing the transition of display screens in a fourth embodiment example.

Referring to FIGS. 30 to 32 showing screen transitions, FIG. 20 showing a hardware configuration, FIGS. 21 and 22 showing internal configurations, and FIG. 23 showing a system configuration, a description will be made, based on the screen transitions, of the process of model change from a current portable telephone to a portable telephone supporting a memory card by issuance of a memory card according to the embodiment of a third embodiment example of the present invention.

FIGS. 30 to 32 are drawings showing the transition of display screens controlled and displayed on the display part 2003 of the automatic contract change apparatus by the display control part 2101. Hereinafter, input is made to screens through the input part 2004 controlled by the input control part 2102.

A reference numeral 1100 designates an initial screen; 1101, a screen for confirming things necessary for model change; 1102, a screen for displaying a list of changeable models and selecting memory card issuance; and 1103, a screen displayed when memory card issuance is selected, displaying notes on memory card issuance. A screen 1104 prompts the user to fill out a memory card issuance application issued from the papers issuance part 2007 controlled by the papers issuance control part 2106. A screen 1105 is displayed when the service center 2300 confirms that the application has been correctly filled out. That is, like the screen 2505 of FIG. 25, a model change application is filled out and set in the paper set part 2011, and the image of the application is obtained using the shooting part 2012 controlled by the shooting control part 2104. The obtained image is sent to the service center 2300 over the network 2301 by the communication control part (2302). The screen is displayed when the service center 2300 checks the application for entry omissions and confirms that it is correctly filled out. 1106 designates a screen for displaying a breakdown of a payment amount involved in issuance of a card. 3100 designates a screen for selecting a payment method. In the example of the screen, cash or a credit card is selected from the screen. A screen 3101 is displayed when the user selects cash as a payment method and pays cash through the cash part 2005 controlled by the cash mechanism control part 2105. A screen 3102 prompts the user to enter the password of a credit card after the user selects a credit card as a payment method and inserts the credit card in the magnetic card read part 2006 controlled by the magnetic card control part 2103. A screen 3103 is displayed when payment terminates with cash or a credit card. A screen 3104 describes the work to be done to create a memory card, such as copying ID information such as a portable telephone number recorded in the internal memory 2200 of a portable telephone currently used to the memory part 2108 and recording the data in the memory card. A screen 3105 requests the user to connect the connecting cable A to the connecting terminal 2018 of the portable telephone currently used. After the connection has been made, the user is instructed to press the End button on the screen. A screen 3106 is displayed when a check is being made of whether the cable connected by the user on the screen 3105 is correctly connected. A screen 3107 is displayed when a portable telephone number and other information are being copied from the portable telephone to a memory card of the memory card issuance part in which the memory card is stored, under control of the memory card issuance control part 2111. A screen 3108 indicates that ID information and other information have been recorded in the memory card, and also displays a button for inquiring of the user whether to copy phone book data. A screen 1300 is displayed when phone data copying was selected on the screen 3108. The screen displays the process of recording phone book data from the internal memory 2200 of the portable telephone to the recording part 2108 of the model change part 2001.

A screen 1301 displays the process of recording to the recording part 2108 of the model change part 2001. A screen 1302 indicates that the phone book data has been copied. A screen 1303 is displayed when a memory card 2023 in which ID information and other information have been recorded is issued from the memory card issuance part 2020 under control of the memory card issuance control part 2111. A screen 1304 is one of screens for checking whether the memory card 2023 operates normally, and has the user select whether he has a portable telephone supporting a memory card, for the purpose of checking. A screen 1305 is displayed when a "Yes" button indicating that the user has a portable telephone supporting a memory card is pressed in the screen 1304, and describes that the user has to insert the memory card 2023 issued in the screen 1303 to the memory card insertion port 2022 of a portable telephone 2021 supporting a memory card the user provides, and a call will be made to the portable telephone from the service center. A screen 1306 inquires of the user whether a call has arrived from the service center as described on the screen 1305. That is, the user is instructed to select between the "Connected" and "Not connected" buttons on the screen. A screen 1307 is displayed when the "Connected" button was pressed on the screen 1306, and instructs the user to receive a memory card issuance end receipt. A screen 1308 is displayed when a call from the service center for checking the operation of the memory card 2023 on the screen 1306 was not connected. It indicates failure in the creation of the memory card 2023 and guides the user to other manned stores. Information about the nearest manned store can be obtained by printed matter from the papers issuance part 2007. After the store information is printed, the initial screen 1100 is displayed. A screen 1309 is displayed when the user does not have a portable telephone supporting a memory card for checking the operation of the memory card 2023. The screen asks the user to purchase a portable telephone supporting a memory card, and then make a call to a toll-free phone for operation checking. After an "End" button is pressed, the initial screen 1100 is displayed.

Figure 33:
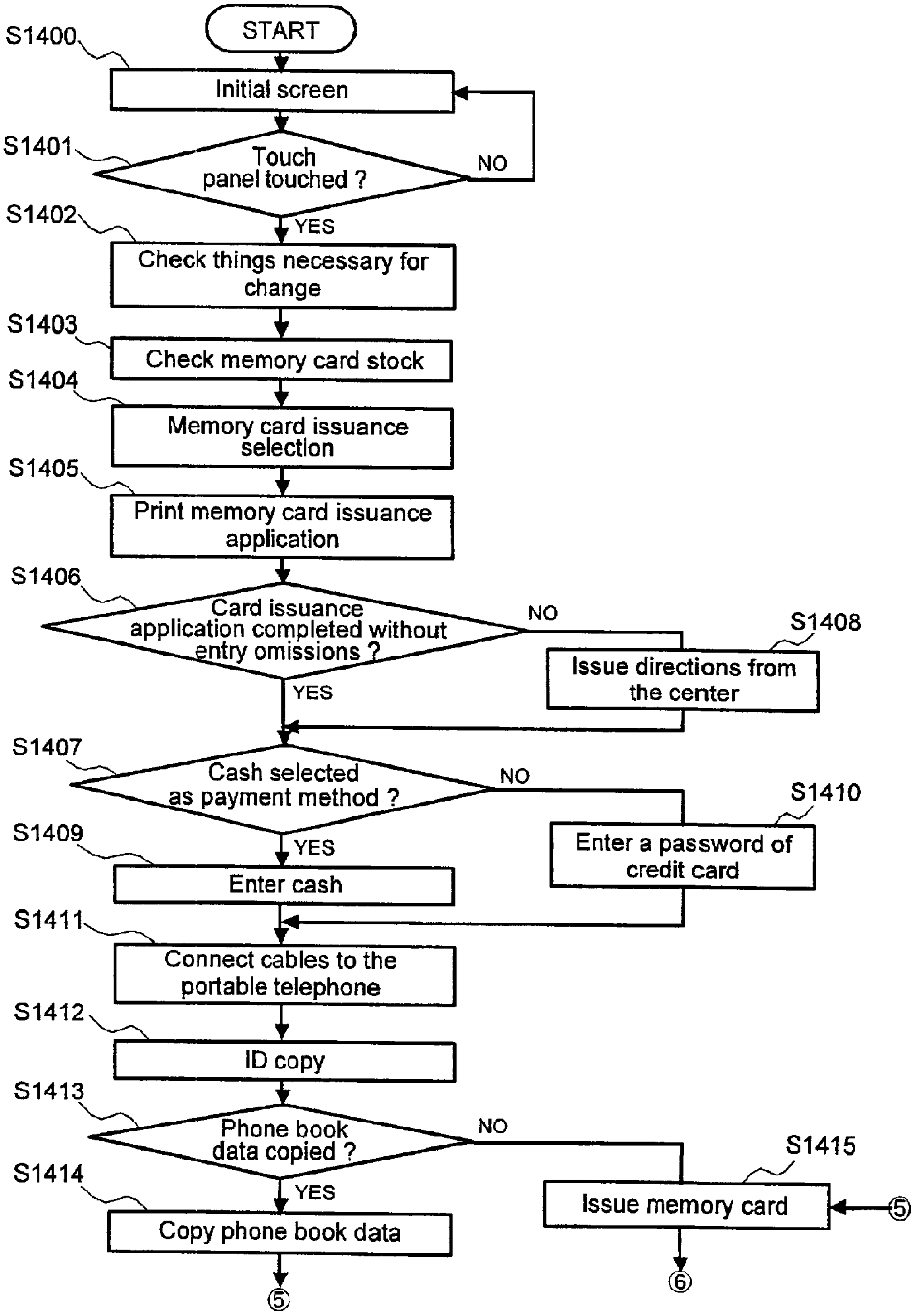
FIG. 33 is a flowchart showing processing of a fourth embodiment example.
Figure 34:
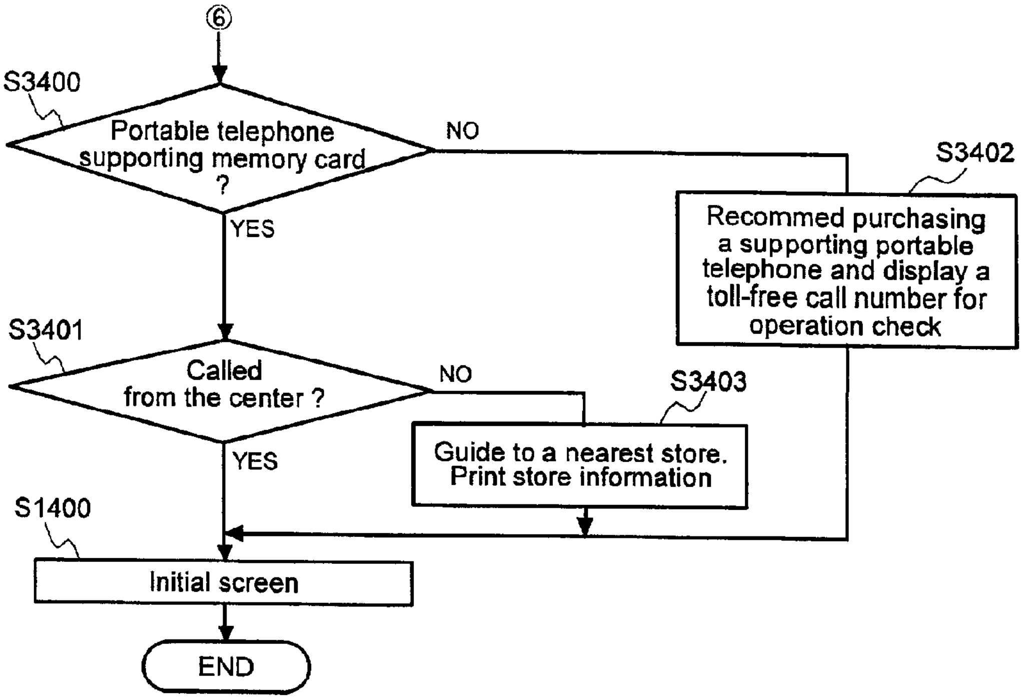
FIG. 34 is a flowchart showing processing of a fourth embodiment example.

FIG. 33 is a flowchart showing processing performed by an automatic contract change apparatus comprising the model change part 2001 and the storing part 2002 in the fourth embodiment example.

The initial screen 1100 stored in the memory part 2108 is displayed in the display part 2003 of the mode change part 2001 under control of the CPU 2100 (S1400). Hereinafter, screens will be displayed in the display part 2003 of the model change part 2001. The user touches the input part 2004 to make a contract change of a product, that is, to change the model of portable telephone. The model change part 2001 judges whether the input part 2004 was touched (S1401). The initial screen 1100 stays displayed as long as the input part 2004 is not touched. To check things necessary for the change, the screen 1101 of FIG. 30 is displayed (S1402). The stock status of portable telephones stored in the product storing boxes 2013 of the storing part 2002 is obtained by consulting the stock information 2401 and the model names 2402 of portable telephone bodies in the table shown in FIG. 24 (S1403), which are stored in the memory part 2108. A model to change to is selected by the user pressing the image of a desired model on the screen 1102. At this time, for models in stock, model numbers associated with the models, displayed on the display screen, are circled using the stock status obtained from the result of S1403 (S1404). After detailed information about memory card issuance is displayed on the screen 1103, a memory card issuance application to be filled out for memory card issuance is printed by the papers issuance part 2007 (S1405), and the user fills out the printed application. The model change application is filled in according to directions displayed on the screen 1104, a seal of approval is pressed, the paper is set on the paper set part 2011, and the shooting part 2012 obtains the image of the model change application when "End" is pressed. The image is sent to an operator of the service center 2300 through the communication control part 2109 and the network 2301. The operator visually checks the sent image on the screen of a personal computer or the like (S1406).

If the model change application is imperfect because of entry omissions, failed image, or the like, the operator of the service center sends modification directions (voice information 2303) to the automatic contract change apparatus over the speaker 2019 or the like via the network 2301 (S1408). As shown in the screen 1105, if it is confirmed that the model change application has been correctly filled out, the user is instructed to put the application in the papers collection box 2008. After "OK" button is pressed for details of purchase amounts displayed on the screen 1106, a payment method is selected on the screen 3100 (S1407). Where cash is specified as a payment method, as shown in the screen 3101, payment is accepted until specified amounts are entered from the cash part 2005 (S1409). Where a payment method is a credit card, the credit card is read by the magnetic card read part 2006 to obtain its magnetic information, and the magnetic information is sent to a credit card company over the network to check whether usable limit amounts are not exceeded. If there is no problem, input of a password is accepted as shown in the screen 3102, the password is sent to the credit card company, and payment by the credit card terminates at the time when a match is found (S1410). Upon completion of payment, the screen 3103 is displayed to indicate the end of payment. At the completion of payment, the screen 3104 is displayed to describe ID copy work, and as shown in the screen 3105, and the connecting cable A 2009 is connected to the connecting terminal of the portable telephone having been so far used (S1411). As shown in the screen 3106, to determine whether the connecting cable A 2009 is correctly connected, the connecting cable control part 2107 checks whether it can see the internal memory 2200 through the cable from the portable telephone. If it is correctly connected, the screen 3107 is displayed in the display part, and after the ID copy work (S1412) has terminated normally, the screen 3108 is displayed to have the user select whether to terminate the processing or copy phone book data (S1413). As shown in the screens 1300, 1301, and 1302, the phone book data is copied in the same procedure as that for the ID copy work in a manner that copies the internal memory of the portable telephone having been so far used to the memory card 2023 (S1414). It is to be understood that information important to the user such as phone book data should be copied to the service center as well via the memory part 2108 of the model change part and the network to provide for dropout of information during copy operation. Later claims to dropout of important information from users can be solved by keeping records, with increased usability.

As shown in the screen 1303, the memory card 2033 is issued (S1415). If "Yes" button is pressed in the screen 1304, as shown in the screen 1305, there is displayed a method of checking the operation of the memory card 2023 by using a portable telephone supporting a memory card (S3400). Since the user does not have a portable telephone supporting a memory card as shown in the screen 1309, there are displayed measures to be taken when the operation of the memory card 2023 cannot be checked (S3402). Or, as described in the screen transition drawing of FIG. 26 for the apparatus of FIG. 20 in the third embodiment example, in order that the user receives a portable telephone in that place, portable telephones may be stored in the storing part 2002.

In the screen 1305, to check whether the ID copy work has terminated normally, that is, whether the memory card 2023 has been normally created, a call is made to the remodeled portable telephone from the service center. If a call is made to the new portable telephone, it is determined that the model change is completed. As shown in the screen 1306, if a call is made to the portable telephone, "Connected" button is pressed. If a call is not made, "Not connected" button is pressed (S3401). If connected, a model change transaction statement for model change is printed in the papers issuance part 2007 and is used as a copy for the user. Further, an advertisement screen as shown by the screen 1307 is displayed and control returns to the initial screen 1100 (S1400). Further, information (the number of sold units, sold model names, dates, store names, etc.) about completed model change transactions is sent to the service center 2300 over the network 2301. However, if not connected, the screen 1308 is displayed to output a message indicating that model change should be made again in a user's nearest manned store, and store information is printed in the papers issuance part 2007 (S3403).

Next, a description will be made of, as a fifth embodiment example, the embodiment of an automatic change apparatus connectable to the connecting terminal of a product having been so far used, regardless of its shape, thereby changing a product involving a contract without canceling the contract.

As the fifth embodiment example, measures to be taken in the case where the shape of a connecting terminal differs for each manufacturer will be described using FIGS. 35, 36, 37, and 38.

Figure 35:
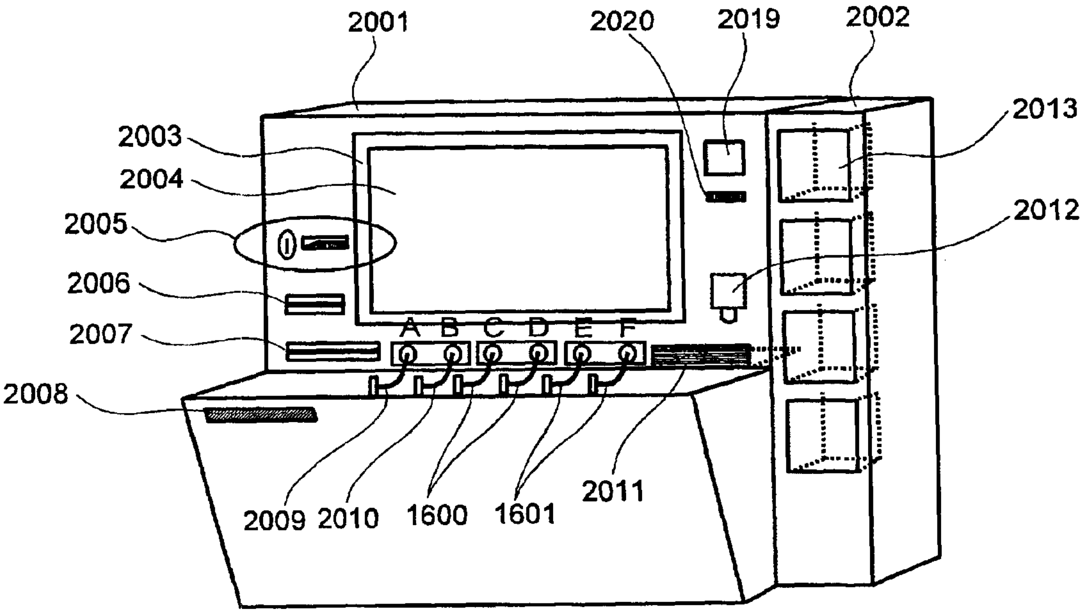
FIG. 35 is a drawing showing an automatic contract change apparatus in a fifth embodiment.
Figure 36:
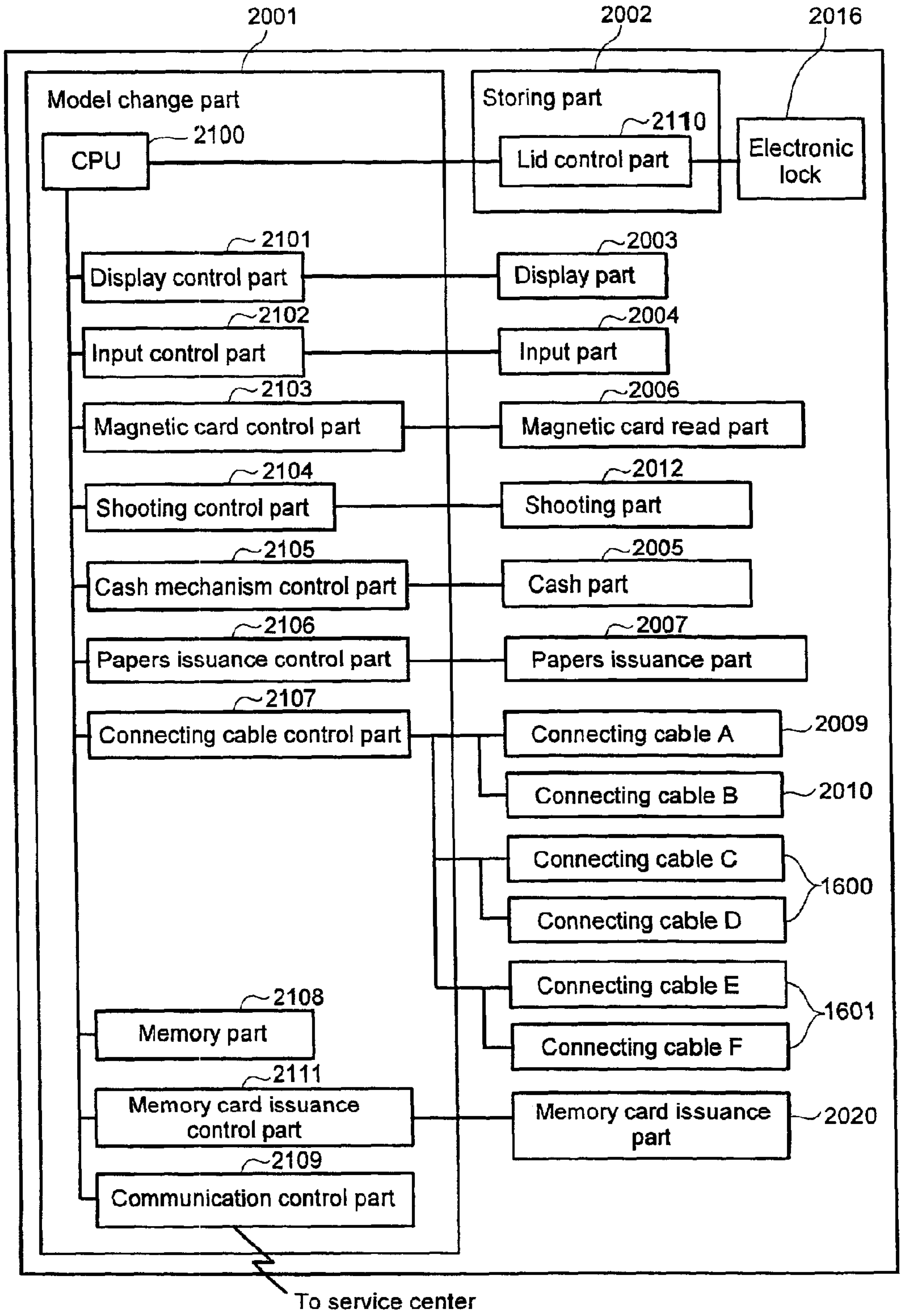
FIG. 36 is a drawing showing the internal structure of an automatic contract change apparatus in a fifth embodiment.
Figure 37:
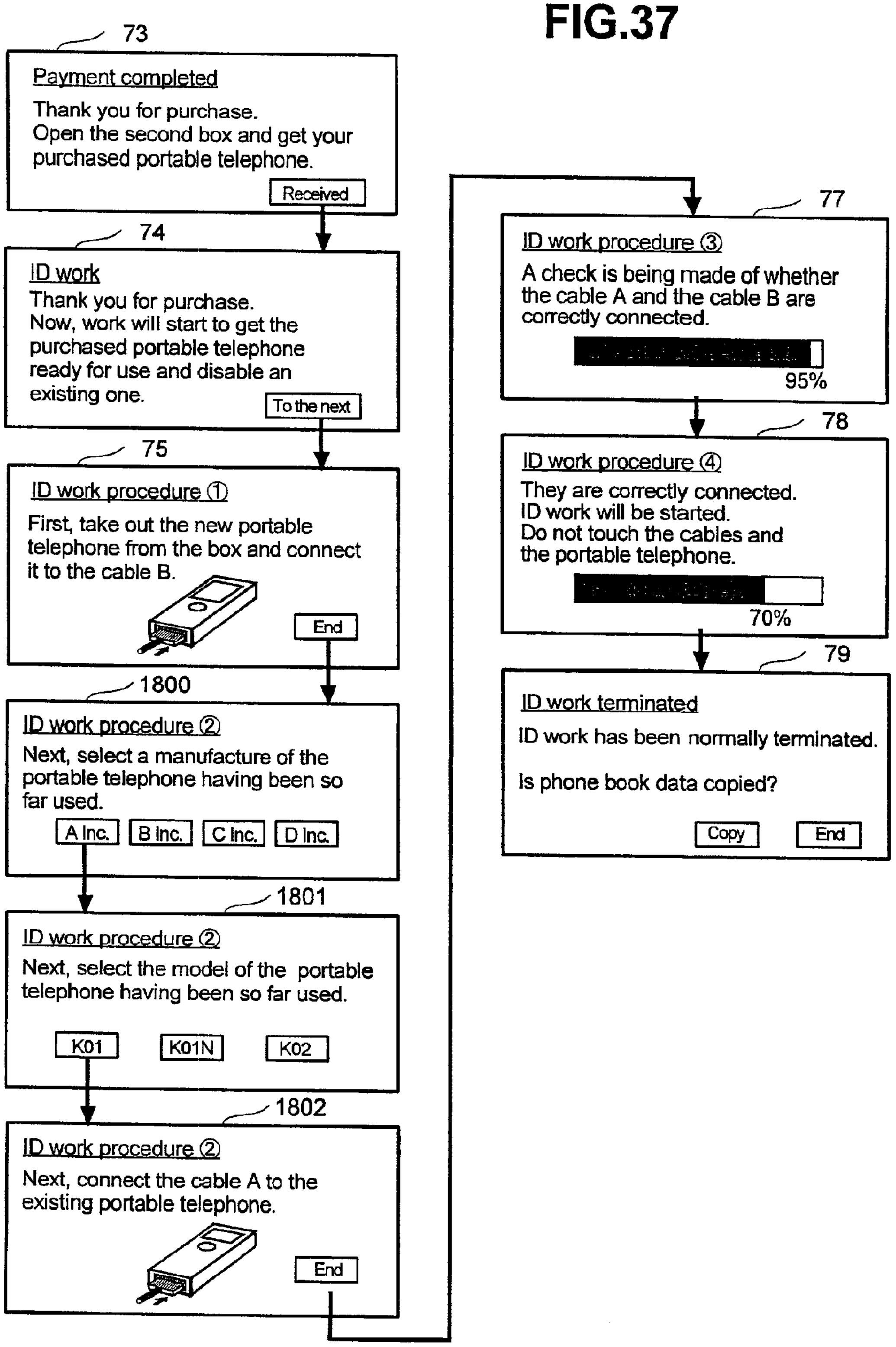
FIG. 37 is a drawing showing the transition of display screens in a fifth embodiment example.

Referring to FIG. 37 showing a screen transition, FIG. 35 showing a hardware configuration, FIG. 36 showing an internal configuration, and FIG. 38 showing a data structure, a description will be made, based on the screen transition, of the process of portable telephone mode change by use of an automatic contract change apparatus according to the embodiment of the fifth embodiment example of the present invention.

An apparatus shown in FIG. 35 is configurationally the same as the apparatus of FIG. 20, except that it has a total of six connecting cables A 2009, B 2020, C and D 1600, and E and F 1601, to permit connection to plural portable telephone terminals each having a different terminal shape.

FIG. 36, which shows the configuration of the apparatus shown in FIG. 35, is the same as the apparatus configuration shown in FIG. 21, except that the connecting cables C and D 1600 and the connecting cables E and F 1601 are connected to the connecting cable control part 2107.

FIG. 37 is a drawing showing the transition of display screens controlled and displayed on the display part 2003 of the automatic contract change apparatus by the display control part 2101. Hereinafter, input is made to screens through the input part 2004 controlled by the input control part 2102. FIG. 37 shows the same processing as in the third embodiment example until the connecting cable A and the like are connected, giving a screen transition for describing an embodiment example for provision for connecting cables of different shapes. The following description will be made with an emphasis on selection of a connecting cable.

As in the screen 2605 of FIG. 26, the user is prompted to connect the cable B to a new portable telephone subject to model change. In this embodiment example, however, a table showing usable cables classified by model change apparatus is defined with a data structure as shown in FIG. 38, and usable cables by portable telephone, indicated by 1900 of the data structure diagram of FIG. 38, are displayed on the screen. The user connects the connecting cable B 2010 according to directions of the screen. The screens 1800 to 1802 are screens for locating the type of a connecting cable for connecting to the portable telephone having been so far used. On the screen 1800, the manufacturer of the portable telephone having been so far used is selected. On the screen 1801, the type name of the portable telephone having been so far used is selected. On the screen 1802, based on portable telephone information entered from the screens 1800 and 1801, the type of a cable to be connected, corresponding to 1900 of the data structure diagram of FIG. 38, is located, and the user is prompted to connect the cable. In this example, the screen is displayed to connect the connecting cable A 2009. Processing in and after 2607, which is the same as processing in FIG. 26, is omitted from the following description.

Although the present invention has been described based on the premise that sales boxes are available to receive a product in that place in the first embodiment example, it goes without saying that, if a product is not received in that place, the apparatus may be configured without sales boxes.

What is claimed is:

1. An automated vending apparatus for portable telephones, comprising:

an input part for receiving information from a user;

a display part for displaying selection screens, from which to select a portable telephone to be purchased;

a communication control part for sending information received by the input part to a remotely-located center;

a payment part for accepting a payment; sales storing boxes for storing portable telephones displayed in the display part, which boxes are controllably unlockable so that the user can take a new portable telephone after completion of payment by the payment part; and an IC card slot to receive an IC card from the user, the IC card including information about a first telephone plan the user had previously accepted.

2. The vending apparatus of claim 1, wherein the input part is used to input a user request to change the first telephone plan to a second telephone plan.

3. The vending apparatus of claim 1, wherein the IC card is configured to be used with a portable telephone previously obtained by the user, wherein the input part is used by the user to request downloading of a game to the IC card once the IC card has been inserted into the IC card slot.

4. An automated vending apparatus for portable telephones, comprising:

an input part for receiving information from a user;

a display part for displaying selection screens, from which to select a portable telephone to be purchased;

a communication control part for sending information received by the input part to a remotely-located center;

a payment part to receive payment from the user;

a sales storing box for storing a portable telephone, the box being controllably unlockable so that the user can take a new portable telephone after completion of a requested action;

a receiving compartment to receive a portable telephone returned by the user, wherein the user is allowed to receive a new portable phone from the sales storing box in exchange for returning a portable phone that the user has previously obtained, wherein the storing box for the new portable telephone is unlocked upon receiving a price difference between the new telephone and the return telephone from the user via the payment part if the new telephone is more expensive than the returned telephone.

5. The vending apparatus of claim 4, further comprising:

a connecting part configured to be connected to a portable telephone, wherein the vending apparatus causes information from the returned telephone to inputted to the new telephone after the user connects the new telephone to the connecting part.

6. The vending apparatus of claim 5, wherein the information inputted to the new telephone relates to phone book data of the returned telephone.

7. An automated vending apparatus for portable telephones, comprising:

an input part for receiving information from a user;

a display part for displaying selection screens, from which to select whether to download a program or purchase a portable telephone;

a communication control part for sending information received by the input part to a remotely-located center;

a sales storing container for storing a portable telephone, the container being controllably unlockable so that the user can take a new portable telephone if the user indicates that the user wishes to purchase the portable telephone using the input part; and a downloading part configured to be coupled to a component of portable telephone of the user, wherein the vending apparatus downloads the program to the component of the portable telephone of the user via the downloading part if the user indicates that the user wishes to download the program using the input part.

8. The vending apparatus of claim 7, further comprising:

a payment part for receiving a payment, wherein the container is unlocked or the program is downloaded after a payment has been received via the payment part from the user.

* * * * *